United States Patent
Abe

(10) Patent No.: US 11,251,895 B2
(45) Date of Patent: Feb. 15, 2022

(54) SEABED BRANCHING DEVICE, OPTICAL SEABED CABLE SYSTEM, AND OPTICAL COMMUNICATION METHOD

(71) Applicant: NEC Corporation, Tokyo (JP)

(72) Inventor: Ryota Abe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/981,497

(22) PCT Filed: Mar. 18, 2019

(86) PCT No.: PCT/JP2019/011044
§ 371 (c)(1),
(2) Date: Sep. 16, 2020

(87) PCT Pub. No.: WO2019/188462
PCT Pub. Date: Oct. 3, 2019

(65) Prior Publication Data
US 2021/0067264 A1   Mar. 4, 2021

(30) Foreign Application Priority Data

Mar. 26, 2018 (JP) .............................. JP2018-057359

(51) Int. Cl.
*H04J 14/02* (2006.01)

(52) U.S. Cl.
CPC ...... *H04J 14/0213* (2013.01); *H04J 14/0204* (2013.01); *H04J 14/0209* (2013.01); *H04J 14/0212* (2013.01)

(58) Field of Classification Search
None
See application file for complete search history.

(56) References Cited

U.S. PATENT DOCUMENTS

2002/0105692 A1* 8/2002 Lauder ............... H04J 14/0227
                                                      398/83
2006/0140625 A1* 6/2006 Ooi ..................... H04J 14/0294
                                                      398/19
(Continued)

FOREIGN PATENT DOCUMENTS

EP    3057247 A1    8/2016
EP    3089382 A1    11/2016
(Continued)

OTHER PUBLICATIONS

International Search Report corresponding to PCT/JP2019/011044, dated Jun. 11, 2019 (7 pages).
(Continued)

*Primary Examiner* — Darren E Wolf

(57) ABSTRACT

To use a plurality of wavelength bands, this seabed branching device comprises: a first demultiplexing unit that demultiplexes a wavelength multiplexed optical signal, which was input from a first terminal, into a first wavelength multiplexed optical signal and a second wavelength multiplexed optical signal; an optical add/drop unit that outputs at least a third wavelength multiplexed optical signal included in the first wavelength multiplexed optical signal to a second terminal station, and outputs at least a fifth wavelength multiplexed optical signal by multiplexing a fourth wavelength multiplexed optical signal included in the first wavelength multiplexed optical signal and a wavelength multiplexed optical signal input from the second terminal station; and a first multiplexing unit that multiplexes the second wavelength multiplexed optical signal and the fifth wavelength multiplexed optical signal, which was input from the optical add/drop unit, and outputs the result to a third terminal station.

8 Claims, 28 Drawing Sheets

(56) References Cited

U.S. PATENT DOCUMENTS

| | | | | |
|---|---|---|---|---|
| 2006/0209854 | A1* | 9/2006 | Katagiri | H04B 10/077 370/401 |
| 2007/0172240 | A1* | 7/2007 | Terai | H04J 14/0212 398/83 |
| 2011/0311216 | A1* | 12/2011 | Inoue | H04J 14/0213 398/1 |
| 2013/0223794 | A1* | 8/2013 | Boduch | H04Q 11/0005 385/24 |
| 2013/0259055 | A1 | 10/2013 | Ji et al. | |
| 2014/0028406 | A1* | 1/2014 | Cao | H03B 5/1215 331/117 FE |
| 2018/0054271 | A1* | 2/2018 | Abe | H04J 14/0219 |

FOREIGN PATENT DOCUMENTS

| | | |
|---|---|---|
| EP | 3273625 A1 | 1/2018 |
| EP | 3276854 A1 | 1/2018 |
| GB | 2433662 B | 4/2009 |
| JP | 2006-191212 A | 7/2006 |
| JP | 2006-262385 A | 9/2006 |
| JP | 2010-226167 A | 10/2010 |
| JP | 2010-283446 A | 12/2010 |
| WO | WO-2006/035520 A1 | 4/2006 |
| WO | WO-2012/132688 A1 | 10/2012 |
| WO | WO-2016/017181 A1 | 2/2016 |
| WO | 2017/022231 A1 | 2/2017 |

OTHER PUBLICATIONS

Written Opinion corresponding to PCT/JP2019/011044, dated Jun. 11, 2019 (16 pages).

Extended European Search Report for EP Application No. EP19774361.0 dated Apr. 29, 2021.

\* cited by examiner

SEABED BRANCHING DEVICE, OPTICAL SEABED CABLE SYSTEM, AND OPTICAL COMMUNICATION METHOD

TECHNICAL FIELD

This application is based upon and claims the benefit of the priority of International Patent Application No. PCT/2019/011044, entitled, SEABED BRANCHING DEVICE, OPTICAL SEABED CABLE SYSTEM, AND OPTICAL COMMUNICATION METHOD, filed on Mar. 18, 2019, which claims the benefit of the priority of Japanese Patent Application No. 2018-057359, filed on Mar. 26, 2018. These applications are incorporated herein by reference. Embodiments of this invention relate to a submarine branching device in an optical submarine cable system.

BACKGROUND ART

A wavelength division multiplexing (WDM) method of multiplexing and transmitting optical signals at various wavelengths for achieving high-capacity communication is used in a trunk long-distance optical communication system.

Signal transmission is controlled on a per-wavelength basis in a WDM-based optical communication system. PTLs 1 and 2 describe examples of an optical add/drop multiplexer (OADM) device and a reconfigurable optical add/drop multiplexer (ROADM) device that are provided in WDM-based optical communication systems. An OADM device and a ROADM device perform adding and dropping of a signal on a per-wavelength basis. Consequently, signal transmission can be controlled on a per-wavelength basis. In recent years, OADM devices and ROADM devices have started to be applied to optical submarine cable systems, and flexible network control has started to be also required in optical submarine cable systems. PTL 3 describes an example of an optical submarine cable system including a submarine branching device having an OADM function. A submarine branching device is laid on the seabed and is provided on an optical submarine cable connecting land terminal stations. A submarine branching device performs adding and dropping of a signal on a wavelength-multiplexed optical signal (WDM signal) input from a land terminal station on a per-wavelength basis and outputs a WDM signal to each land terminal station.

CITATION LIST

Patent Literature

PTL 1: International Application Publication No. WO 2016/017181
PTL 2: Japanese Unexamined Patent Application Publication No. 2010-283446
PTL 3: International Application Publication No. WO 2012/132688

SUMMARY OF INVENTION

Technical Problem

With recent increase in communication traffic, for example, an optical transmission system using a plurality of wavelength bands, such as both of a wavelength band in a conventional band (C-band: 1550 nm band) and a wavelength band in a long wavelength band (L-band: 1580 nm band), is under study in an optical submarine cable system, in order to achieve higher capacity communication.

In order to provide a submarine optical transmission system using a plurality of wavelength bands, a submarine branching device applicable to any WDM signal in the plurality of wavelength bands is required.

Then, an object of the present invention is to provide a submarine branching device, a submarine optical communication system, and an optical communication method that are applicable to WDM signals in a plurality of wavelength bands.

Solution to Problem

A submarine branching device according to the present invention includes: a first demultiplexing unit demultiplexing a wavelength-multiplexed optical signal input from a first terminal station into a first wavelength-multiplexed optical signal and a second wavelength-multiplexed optical signal; an optical add/drop unit outputting at least a third wavelength-multiplexed optical signal included in the first wavelength-multiplexed optical signal to a second terminal station, and multiplexing at least a fourth wavelength-multiplexed optical signal included in the first wavelength-multiplexed optical signal and a wavelength-multiplexed optical signal input from the second terminal station and outputting a fifth wavelength-multiplexed optical signal; and a first multiplexing unit multiplexing the second wavelength-multiplexed optical signal and a fifth wavelength-multiplexed optical signal input from the optical add/drop unit and outputting the multiplexed signal to a third terminal station.

An optical submarine cable system according to the present invention includes: first, second, and third terminal stations each of which being capable of outputting a wavelength-multiplexed optical signal; and a submarine branching device connected to the first, second, and third terminal stations through an optical submarine cable, wherein the submarine branching device includes: a first demultiplexing unit demultiplexing a wavelength-multiplexed optical signal input from the first terminal station into a first wavelength-multiplexed optical signal and a second wavelength-multiplexed optical signal; an optical add/drop unit outputting at least a third wavelength-multiplexed optical signal included in the first wavelength-multiplexed optical signal to the second terminal station, and multiplexing at least a fourth wavelength-multiplexed optical signal included in the first wavelength-multiplexed optical signal and a wavelength-multiplexed optical signal input from the second terminal station and outputting a fifth wavelength-multiplexed optical signal; and a first multiplexing unit multiplexing the second wavelength-multiplexed optical signal and a fifth wavelength-multiplexed optical signal input from the optical add/drop unit and outputting the multiplexed signal to the third terminal station.

An optical communication method according to the present invention includes: demultiplexing a wavelength-multiplexed optical signal input from a first terminal station into a first wavelength-multiplexed optical signal and a second wavelength-multiplexed optical signal; outputting at least a third wavelength-multiplexed optical signal included in the first wavelength-multiplexed optical signal to a second terminal station, and multiplexing at least a fourth wavelength-multiplexed optical signal included in the first wavelength-multiplexed optical signal and a wavelength-multiplexed optical signal input from a second terminal station and outputting a fifth wavelength-multiplexed optical signal; and multiplexing the second wavelength-multiplexed optical signal and the fifth wavelength-multiplexed optical signal and outputting the multiplexed signal to a third terminal station.

Advantageous Effects of Invention

The present invention can provide a submarine branching device, an optical submarine cable system, and an optical communication method that are applicable to WDM signals in a plurality of wavelength bands.

EXAMPLE EMBODIMENT

Next, example embodiments of the present invention will be described in detail with reference to drawings.

First Example Embodiment

Configuration

Figure 1:
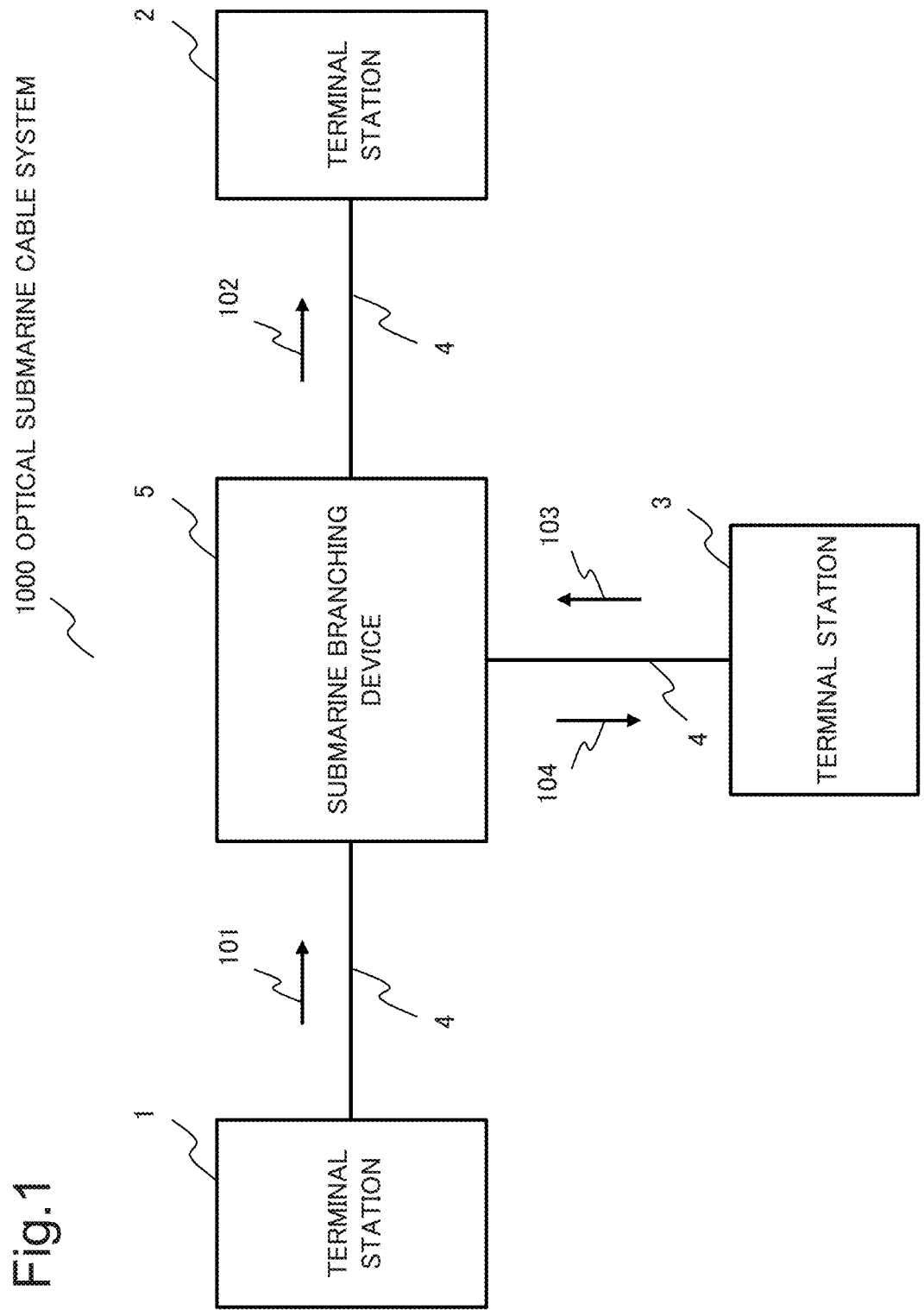
FIG. 1 is a diagram illustrating a configuration example of an optical submarine cable system according to a first example embodiment.

FIG. 1 illustrates a configuration example of an optical submarine cable system according to a first example embodiment of the present invention. The optical submarine cable system 1000 in FIG. 1 includes a terminal station 1, a terminal station 2, a terminal station 3, an optical submarine cable 4, and a submarine branching device 5. The terminal station 1, the terminal station 2, the terminal station 3, and the submarine branching device 5 are connected to one another through the optical submarine cable 4. Each of the terminal stations 1, 2, and 3 is a station office installed on land and includes an optical communication device capable of transmitting and receiving optical signals. The terminal stations 1, 2, and 3 perform transmission of WDM signals through the optical submarine cable 4.

The submarine branching device 5 has a function of adding/dropping a wavelength-multiplexed optical signal. A WDM signal 101 and a WDM signal 103 are input to the submarine branching device 5 from the terminal station 1 and the terminal station 3, respectively. The submarine branching device 5 outputs a WDM signal 102 and a WDM signal 104 to the terminal station 2 and the terminal station 3, respectively. While FIG. 1 illustrates a signal transmitted in a direction from the terminal station 1 to the terminal station 2 (upstream direction), an unillustrated signal is also transmitted in a direction from the terminal station 2 to the terminal station 1 (downstream direction) through the optical submarine cable 4. The optical submarine cable 4 includes a plurality of fibers, and a signal in the upstream direction and a signal in the downstream direction may be transmitted through different fibers. Each of the upstream direction and the downstream direction may be configured with a plurality of optical fibers. Submarine repeaters each of which including an amplifier, or the like may be placed between the terminal stations 1, 2, and 3 and the submarine branching device 5.

Figure 2:
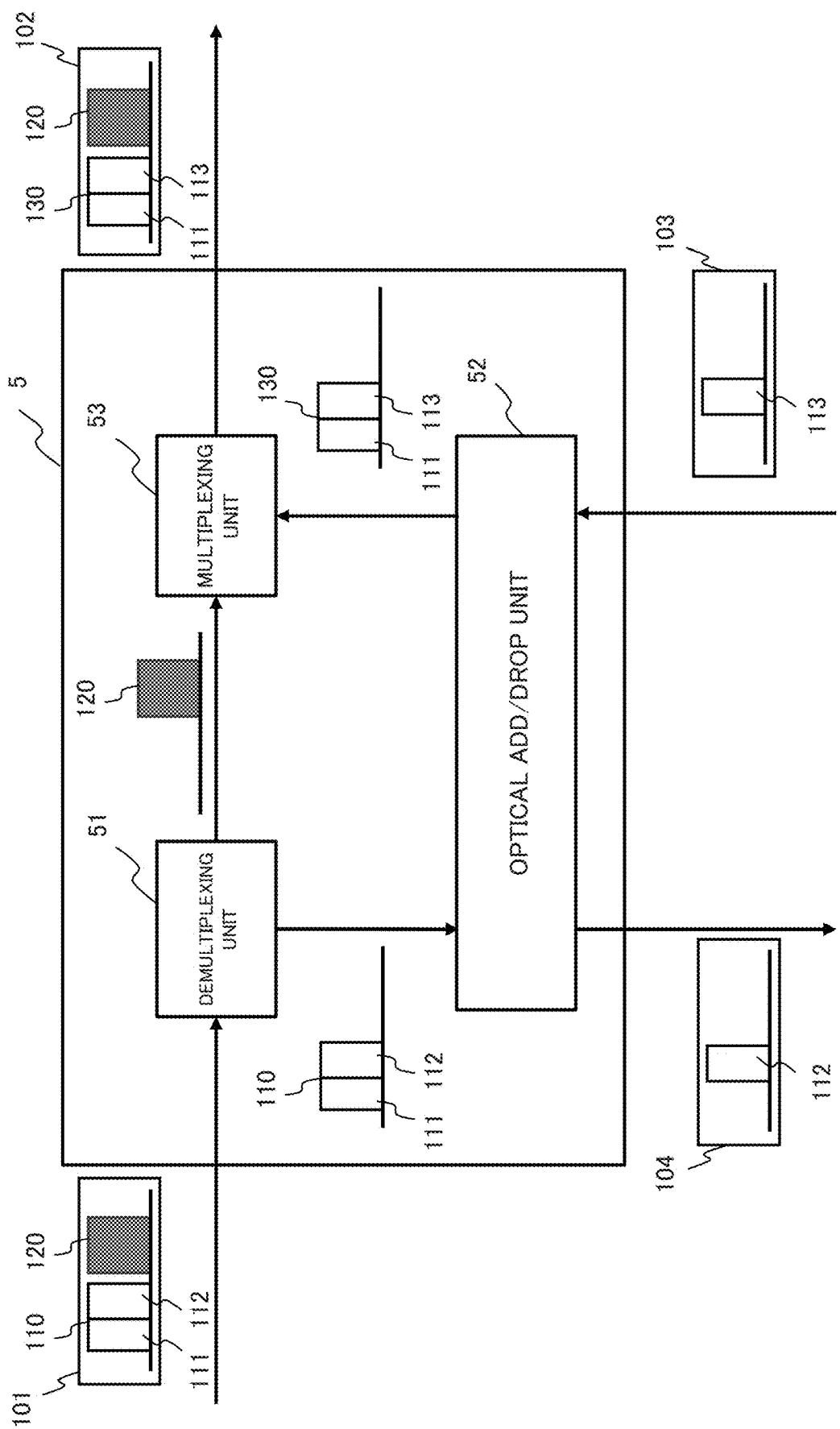
FIG. 2 is a diagram illustrating a configuration example of a submarine branching device according to the first example embodiment.

FIG. 2 illustrates a configuration example of the submarine branching device 5 according to the first example embodiment. According to FIG. 2, the submarine branching device 5 includes a demultiplexing unit 51, an optical add/drop unit 52, and a multiplexing unit 53. An arrow illustrated in FIG. 2 indicates a transmission direction of a WDM signal. While the C-band and the L-band will be described as an example of a plurality of wavelength bands in the following description about the present example embodiment, a plurality of wavelength bands applied to the present example embodiment are not limited to the above.

The demultiplexing unit 51 demultiplexes the WDM signal 101 input from the terminal station 1. The WDM signal 101 includes a WDM signal (C-band signal) 110 having a C-band wavelength and a WDM signal (L-band signal) 120 having an L-band wavelength. The demultiplexing unit 51 demultiplexes the WDM signal 101 into the C-band signal 110 and the L-band signal 120, and outputs the C-band signal 110 to the optical add/drop unit 52 and outputs the L-band signal 120 to the multiplexing unit 53. For example, the demultiplexing unit 51 may be a wavelength selective switch (WSS) selectively switching a wavelength output to a specific port, an optical filter selectively transmitting or reflecting a specific wavelength, or a combination of an optical coupler and an optical filter selectively transmitting a specific wavelength. A wavelength band demultiplexed by the demultiplexing unit 51 may be changeable. A change of a wavelength band may be performed in accordance with control from an unillustrated control device.

The optical add/drop unit 52 has a function of adding/dropping a specific wavelength. The C-band signal 110 input to the optical add/drop unit 52 includes a band signal 111 and a band signal 112. The optical add/drop unit 52 outputs the WDM signal 104 including the band signal 112 included in the C-band signal 110 to the terminal station 3. Further, the optical add/drop unit 52 multiplexes the band signal 111 included in the C-band signal 110 and a band signal 113 included in the WDM signal 103 input from the terminal station 3, and outputs a C-band signal 130 to the multiplexing unit 53. Each of the band signals 111, 112, and 113 may be a WDM signal or a single-wavelength signal. Data to be received by the terminal station 2 may be superposed on the band signals 111 and 113. Data to be received by the terminal station 3 may be superposed on the band signal 112. Wavelength bands of the band signal 111 and the band signal 112 are not limited to be uniform as illustrated in FIG. 2. Furthermore, a wavelength band added/dropped by the optical add/drop unit 52 may be changeable. A change of a wavelength band may be performed in accordance with control from an unillustrated control device.

The WDM signal 104 output to the terminal station 3 by the optical add/drop unit 52 has only to include at least the band signal 112. Accordingly, for example, the optical add/drop unit 52 may output the WDM signal 104 including the band signal 111 and the band signal 112 to the terminal station 3. While the WDM signal 103 input to the optical add/drop unit 52 may include a dummy signal having a wavelength band corresponding to the band signal 111, the optical add/drop unit 52 in this case may output the WDM signal 104 including the dummy signal and the band signal 112 to the terminal station 3.

The multiplexing unit 53 multiplexes the L-band signal 120 input from the demultiplexing unit 51 and the C-band signal 130 input from the optical add/drop unit 52 and outputs the WDM signal 102 to the terminal station 2. For example, the multiplexing unit 53 may be a WSS or an optical coupler.

Operation

Figure 3:
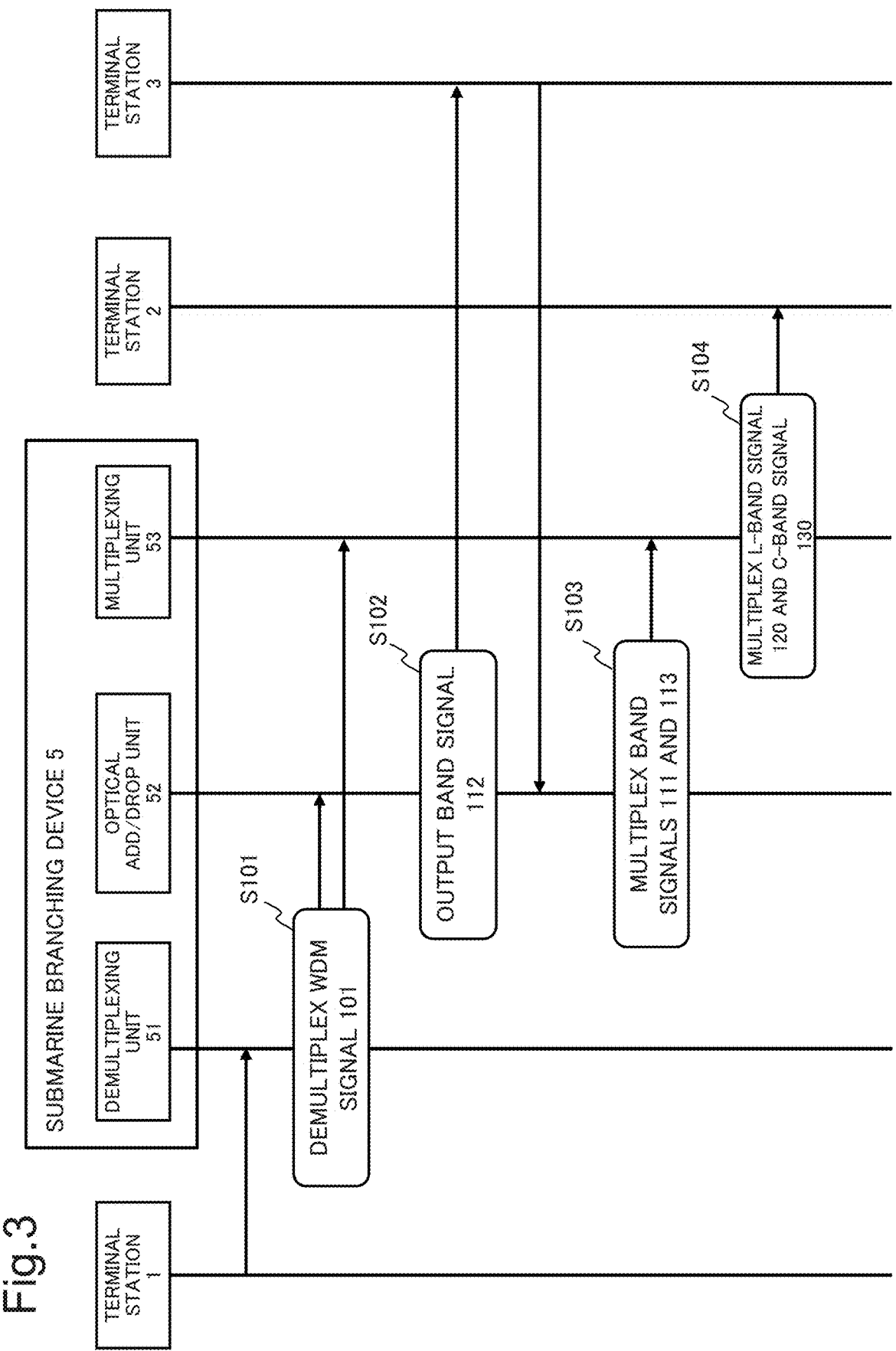
FIG. 3 is a sequence diagram illustrating an operation example of the submarine branching device according to the first example embodiment.

An operation example of the submarine branching device according to the first example embodiment will be described below by use of FIG. 3.

The demultiplexing unit 51 demultiplexes the WDM signal 101 input from the terminal station 1 into the C-band signal 110 and the L-band signal 120 (S101).

The optical add/drop unit 52 outputs the WDM signal 104 including the band signal 112 included in the C-band signal 110 to the terminal station 3 (S102).

The optical add/drop unit 52 outputs, to the multiplexing unit 53, the C-band signal 130 acquired by multiplexing the band signal 111 included in the C-band signal 110 and the band signal 113 included in the WDM signal 103 input from the terminal station 3 (S103). An order in which S102 and S103 are executed is not limited, and S102 may be executed after S103 is executed. S102 and S103 may be executed simultaneously.

The multiplexing unit 53 multiplexes the L-band signal 120 input from the demultiplexing unit 51 and the C-band signal 130 input from the optical add/drop unit 52 and outputs the WDM signal 102 to the terminal station 2 (S104).

Effects

The submarine branching device according to the present example embodiment demultiplexes an input WDM signal into a plurality of wavelength bands, such as a C-band signal and an L-band signal, and performs add/drop on one of the signals. Consequently, an output destination of a WDM signal including a plurality of wavelength bands can be controlled on a per-wavelength basis. Accordingly, a submarine branching device capable of providing an optical transmission system using a plurality of wavelength bands can be provided.

As exemplified in the present example embodiment, by demultiplexing an input WDM signal into a C-band signal and an L-band signal, an output destination of the WDM signal including the C-band signal and the L-band signal can be controlled on a per-wavelength basis. Consequently, an output destination of the WDM signal including the C-band signal and the L-band signal can be controlled on a per-wavelength basis. Accordingly, a submarine branching device capable of providing an optical transmission system using the C-band and the L-band can be provided.

While it is assumed that the submarine branching device according to the present example embodiment performs add/drop on a C-band signal, the submarine branching device may perform add/drop on an L-band signal. In this case, the demultiplexing unit 51 outputs the L-band signal 120 to the optical add/drop unit 52, and the optical add/drop unit 52 performs add/drop on the L-band signal 120. A wavelength band added/dropped by the submarine branching device may be set during manufacture or may be dynamically controlled. A change of a wavelength band may be performed in accordance with control from an unillustrated control device.

When performing add/drop on a C-band signal, the optical add/drop unit 52 in the submarine branching device according to the present example embodiment may be applied to part of an OADM device or a ROADM device used in a C-band optical transmission system. Accordingly, an effect of reducing a manufacture cost of a submarine branching device applicable to an optical transmission system using the C-band and the L-band is provided.

While a signal output in the direction from the terminal station 1 to the terminal station 2 (upstream direction) has been described in the present example embodiment, the same may similarly apply to a signal output in the direction from the terminal station 2 to the terminal station 1 (downstream direction).

Second Example Embodiment

Configuration

A second example embodiment of the present invention will be described. A submarine branching device according to the second example embodiment of the present invention comprises a configuration to be capable of flexibly controlling an output destination of an input wavelength-multiplexed optical signal on a per-wavelength basis. Description of a configuration similar to that in the first example embodiment of the present invention is omitted in the second example embodiment of the present invention.

A configuration example of an optical submarine cable system according to the second example embodiment of the present invention is similar to the configuration example of the optical submarine cable system 1000 illustrated in FIG. 1.

Figure 4:
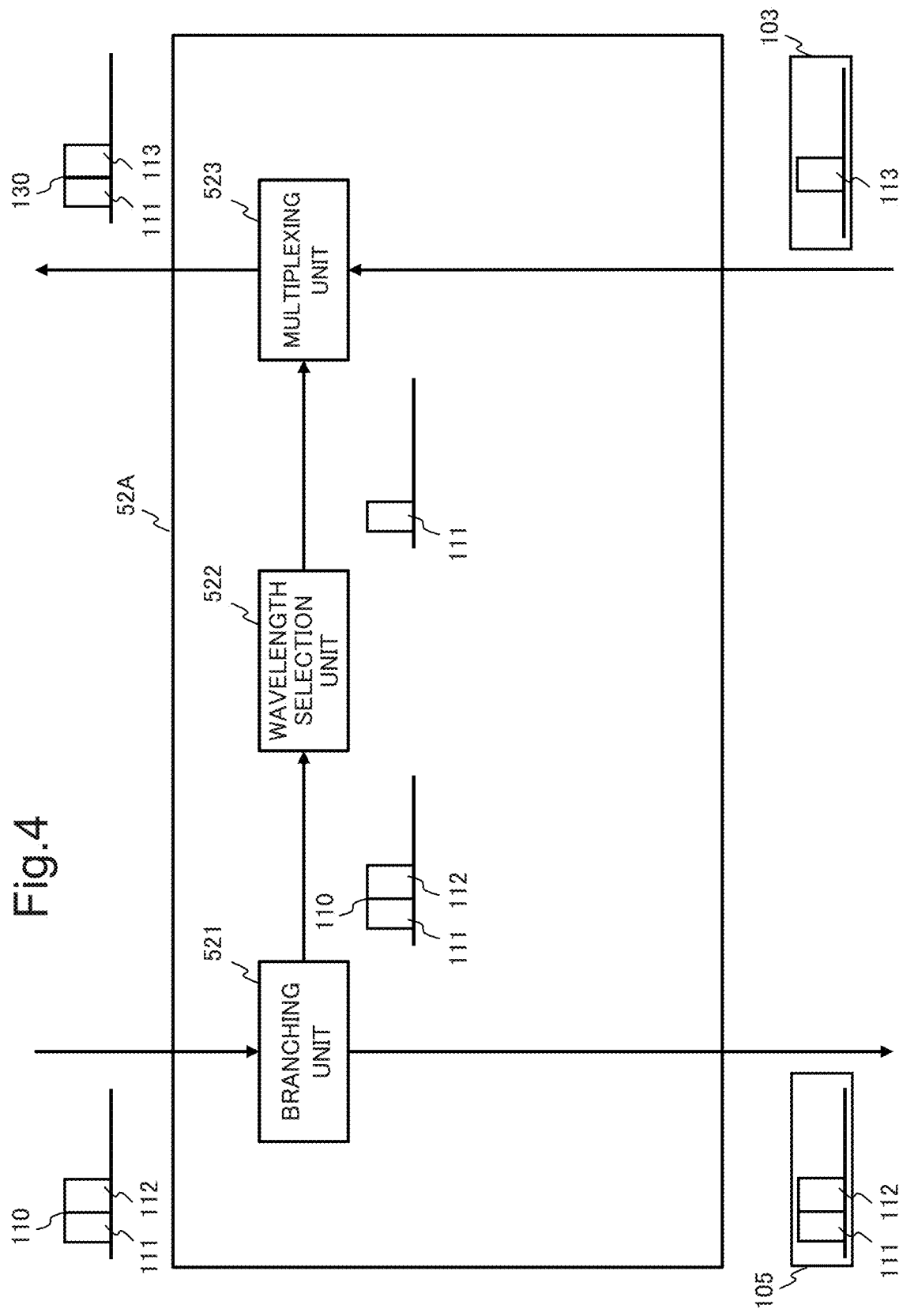
FIG. 4 is a diagram illustrating a configuration example of an optical add/drop unit according to a second example embodiment.

Compared with the configuration illustrated in FIG. 2, the submarine branching device according to the second example embodiment of the present invention includes an optical add/drop unit 52A in place of the optical add/drop unit 52. The optical add/drop unit 52A comprises a configuration to be capable of flexibly controlling an output destination of an input wavelength-multiplexed optical signal on a per-wavelength basis. FIG. 4 illustrates a configuration example of the optical add/drop unit 52A according to the second example embodiment of the present invention. The optical add/drop unit 52A includes a branching unit 521, a wavelength selection unit 522, and a multiplexing unit 523.

The branching unit 521 branches a C-band signal 110 input from a demultiplexing unit 51. The branching unit 521 outputs one of the branched C-band signals 110 to the wavelength selection unit 522. The branching unit 521 outputs the other of the branched C-band signals 110 to a terminal station 3 as a WDM signal 105. For example, the branching unit 521 may be an optical coupler.

The wavelength selection unit 522 transmits a band signal 111 included in a C-band signal 110 input from the branching unit 521. The wavelength selection unit 522 outputs the transmitted band signal 111 to the multiplexing unit 523. The wavelength selection unit 522 may block a band signal 112 included in the C-band signal 110 input from the branching unit 521. The wavelength selection unit 522 may be an optical filter selectively transmitting a specific wavelength and blocking the other wavelength bands. A wavelength band transmitted by the wavelength selection unit 522 may be changeable. A change of a wavelength band may be performed in accordance with control from an unillustrated control device.

The multiplexing unit 523 multiplexes the band signal 111 input from the wavelength selection unit 522 and a band signal 113 included in a WDM signal 103 input from the terminal station 3 and outputs a C-band signal 130. For example, the multiplexing unit 523 may be an optical coupler.

The wavelength selection unit 522 and the multiplexing unit 523 may be a WSS combining the aforementioned functions. In this case, the WSS performs add/drop on the input C-band signal 110 and the input WDM signal 103, and outputs the C-band signal 130.

Operation

Figure 5:
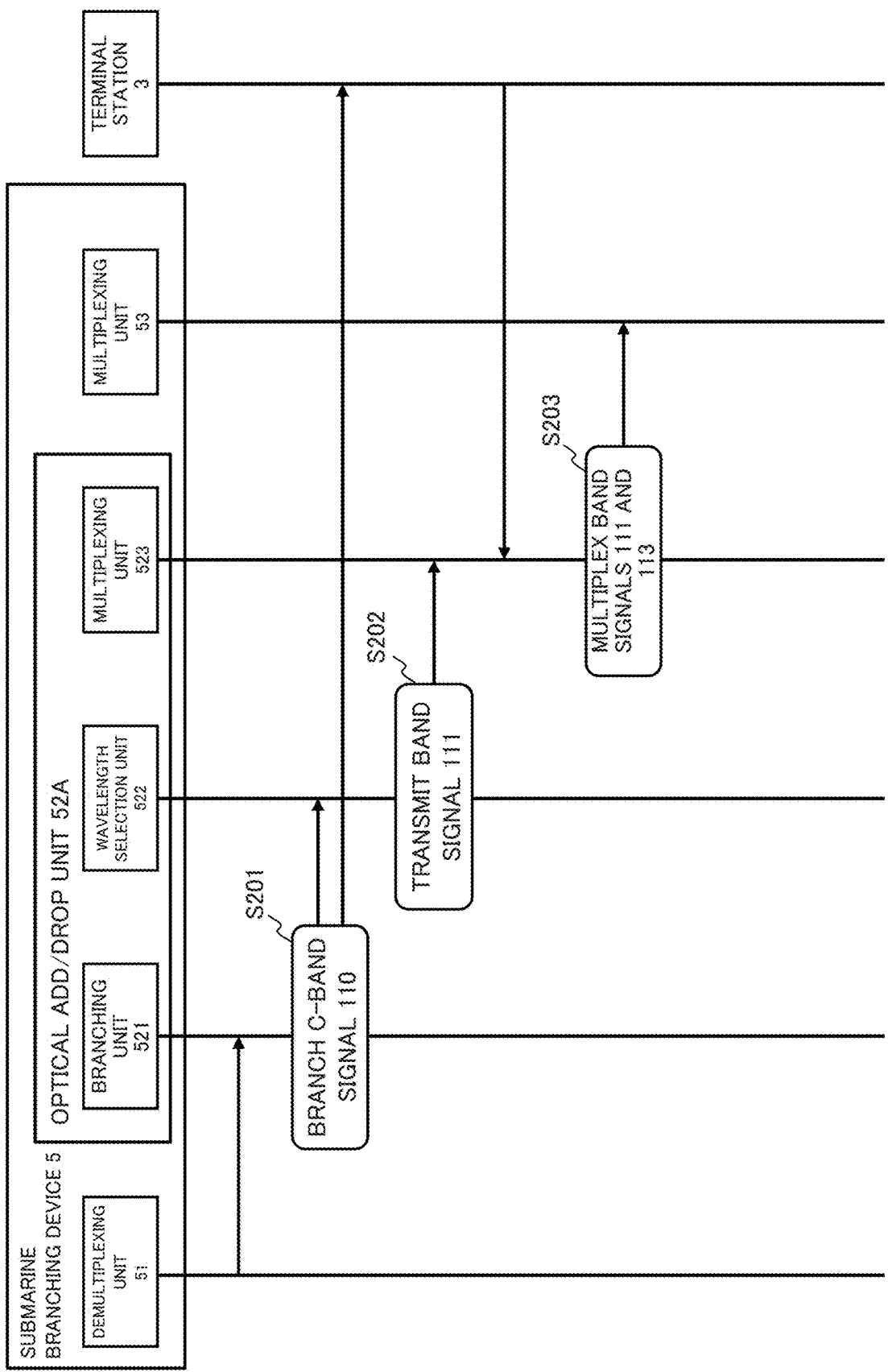
FIG. 5 is a sequence diagram illustrating an operation example of the optical add/drop unit according to the second example embodiment.

An operation example of the optical add/drop unit 52A according to the second example embodiment will be described below by use of FIG. 5. Description of an operation example similar to that in the first example embodiment of the present invention is omitted in the second example embodiment of the present invention.

The branching unit 521 branches the C-band signal 110 input from the demultiplexing unit 51 to the optical add/drop unit 52 (S201).

The wavelength selection unit 522 transmits the band signal 111 included in the C-band signal 110 input from the branching unit 521 (S202).

The multiplexing unit 523 multiplexes the band signal 111 input from the wavelength selection unit 522 and the band signal 113 included in the WDM signal 103 and outputs the multiplexed signal to the multiplexing unit 53 as the C-band signal 130 (S203).

Effects

The optical add/drop unit according to the present example embodiment comprises a configuration to be capable of selectively transmitting a band signal included in an input C-band signal and outputting a WDM signal including the transmitted band signal. Consequently, an output destination of a WDM signal can be flexibly controlled on a per-wavelength basis. Accordingly, a submarine branching device capable of providing an optical transmission system using the C-band and the L-band can be provided.

Third Example Embodiment

Configuration

A third example embodiment of the present invention will be described. A submarine branching device according to the third example embodiment of the present invention comprises a configuration to be capable of ensuring data confidentiality. Description of a configuration similar to that in another example embodiment of the present invention is omitted in the third example embodiment of the present invention.

A configuration example of an optical submarine cable system according to the third example embodiment of the present invention is similar to the configuration example of the optical submarine cable system 1000 illustrated in FIG. 1.

The optical add/drop unit 52 according to the aforementioned second example embodiment of the present invention outputs the WDM signal 105 including the band signal 111 to the terminal station 3. Data to be received by the terminal station 2 may be superposed on the band signal 111, but at this time, the band signal 111 is output to the terminal station 3 not being an original destination.

Then, the submarine branching device according to the third example embodiment of the present invention performs predetermined waveform processing on a band signal on which data to be received by the terminal station 2 are superposed. Consequently, even when a signal is output to a terminal station not being an original destination, data confidentiality can be ensured.

Figure 6:
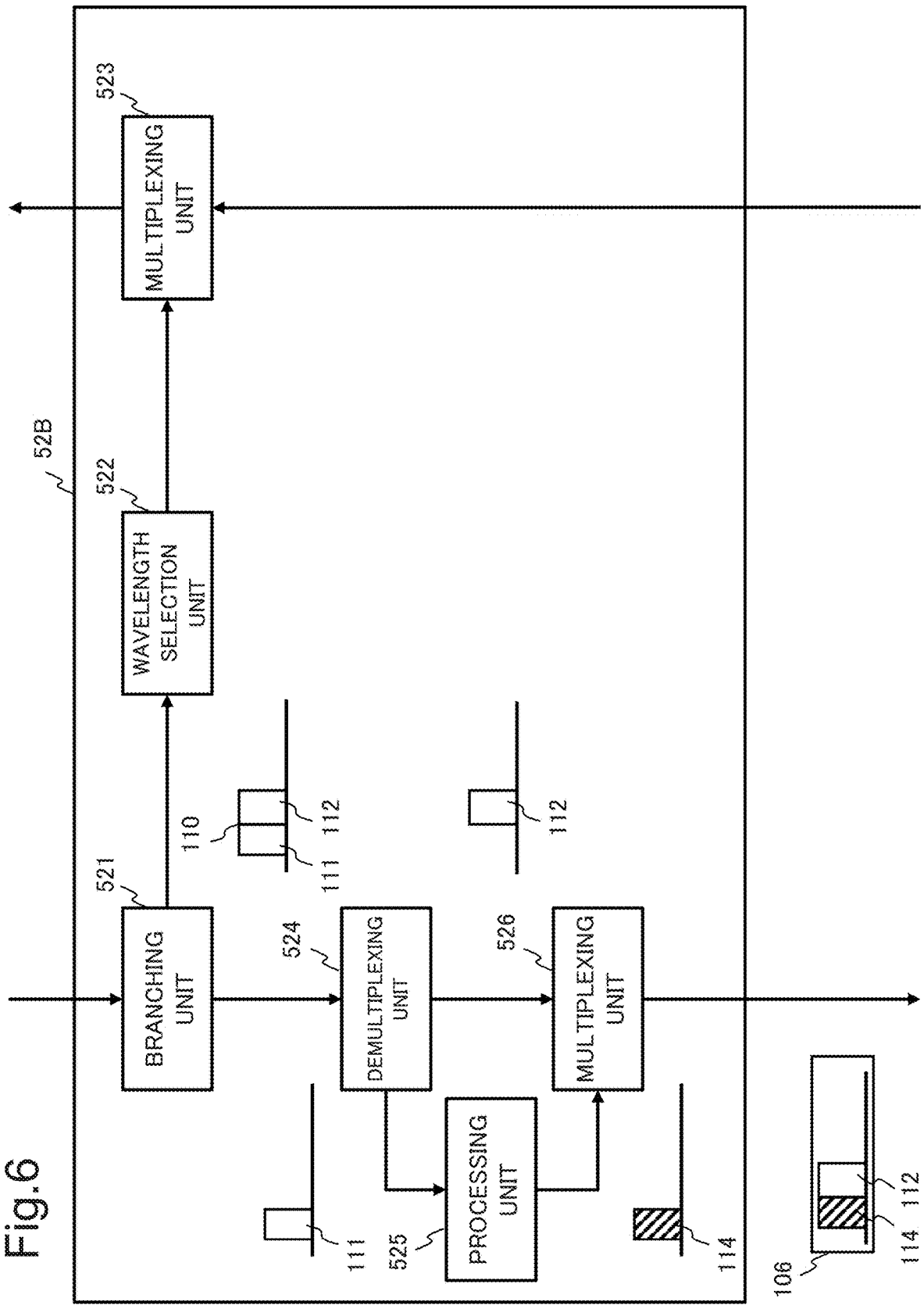
FIG. 6 is a diagram illustrating a configuration example of an optical add/drop unit according to a third example embodiment.

Compared with the configuration illustrated in FIG. 2, the submarine branching device according to the third example embodiment of the present invention includes an optical add/drop unit 52B in place of the optical add/drop unit 52. FIG. 6 illustrates a configuration example of the optical add/drop unit 52 according to the third example embodiment of the present invention. In addition to the configuration illustrated in FIG. 4, the optical add/drop unit 52B includes a demultiplexing unit 524, a processing unit 525, and a multiplexing unit 526.

The demultiplexing unit 524 demultiplexes a C-band signal 110 input from a branching unit 521 into a band signal 111 and a band signal 112. The demultiplexing unit 524 outputs the band signal 111 to the processing unit 525 and outputs the band signal 112 to the multiplexing unit 526. For example, the demultiplexing unit 524 may be a WSS selectively switching a wavelength output to a specific port, an optical filter selectively transmitting or reflecting a specific wavelength, or a combination of an optical coupler and an optical filter selectively transmitting a specific wavelength. A wavelength band demultiplexed by the demultiplexing unit 524 may be changeable. A change of a wavelength band may be performed in accordance with control from an unillustrated control device.

The processing unit 525 generates a processed signal 114 by applying predetermined waveform processing to the band signal 111 input from the demultiplexing unit 524. The processing unit 525 outputs the processed signal 114 to the multiplexing unit 526. As the predetermined waveform processing, the processing unit 525 may add a predetermined pattern to the band signal 111. For example, the predetermined pattern may be a dummy pattern in which 0 and 1 are randomly arranged or a fixed pattern in which 0 and 1 are arranged in a specific pattern. Further, as the predetermined waveform processing, the processing unit 525 may perform scrambling processing on the band signal 111. Further, as the predetermined waveform processing, the processing unit 525 may degrade a transmission characteristic of the band signal 111. Furthermore, the processing unit 525 may delay the band signal 111 and cause the multiplexing unit 526 to multiplex the delayed signal as a delayed optical signal. The predetermined waveform processing executed by the processing unit 525 may be changeable. A change of the waveform processing may be performed in accordance with control from an unillustrated control device.

The multiplexing unit 526 multiplexes the band signal 112 and the processed signal 114 and outputs the multiplexed signal to the terminal station 3 as a WDM signal 106. The multiplexing unit 526 may be an optical coupler.

Operation

Figure 7:
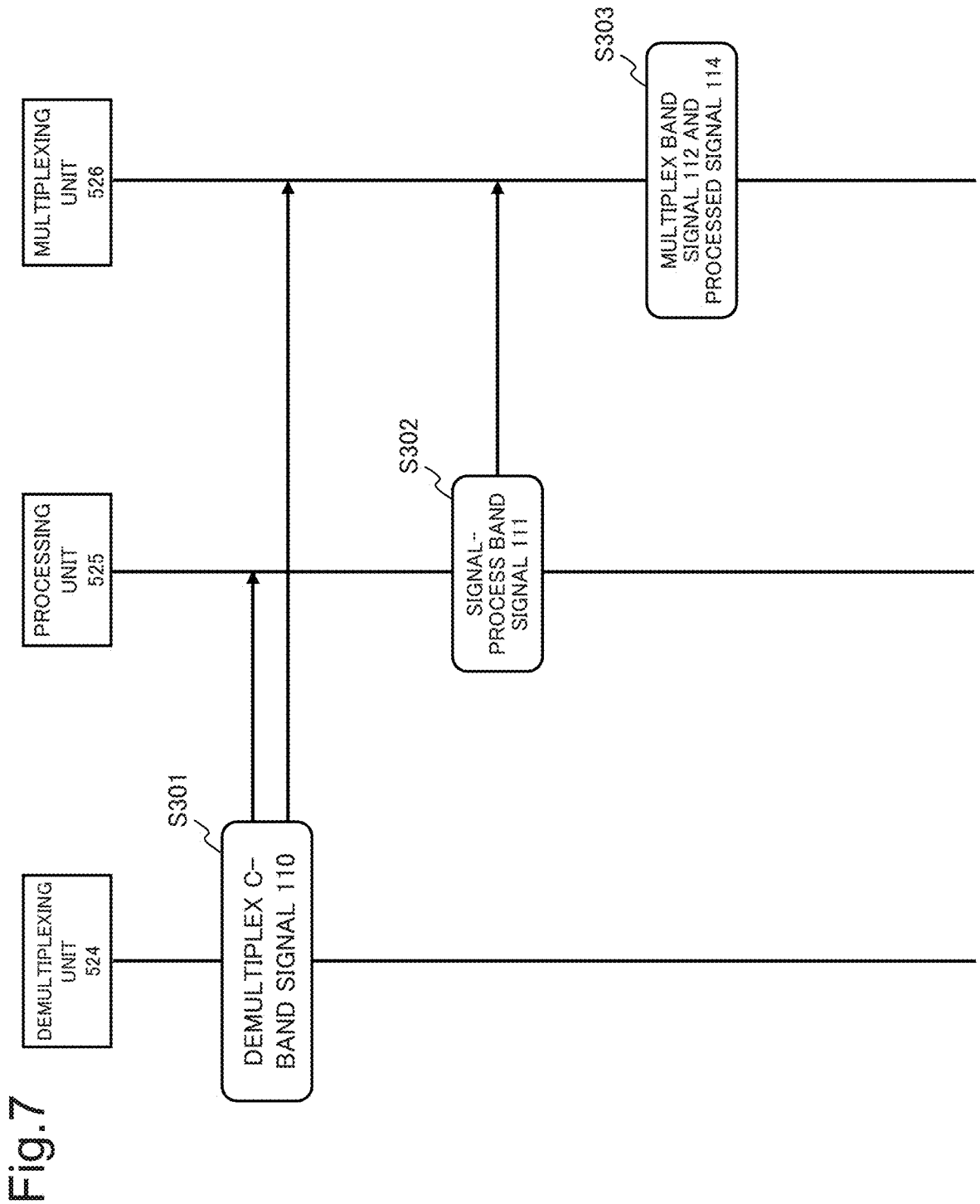
FIG. 7 is a sequence diagram illustrating an operation example of the optical add/drop unit according to the third example embodiment.

Operation examples of the demultiplexing unit 524, the processing unit 525, and the multiplexing unit 526, according to the third example embodiment, will be described below by use of FIG. 7. An operation example of a configuration not illustrated in FIG. 7 is similar to that in the second example embodiment, and therefore description thereof is omitted.

The demultiplexing unit 524 demultiplexes the C-band signal 110 input from the branching unit 521 into the band signal 111 and the band signal 112 (S301).

The processing unit 525 generates the processed signal 114 by applying predetermined waveform processing on the band signal 111 input from the demultiplexing unit 524 (S302).

The multiplexing unit 526 multiplexes the band signal 112 input from the demultiplexing unit 524 and the processed signal 114 input from the processing unit 525 (S303).

Effects

The optical add/drop unit according to the present example embodiment comprises a configuration to apply predetermined waveform processing to a signal on which data output to a terminal station not being an original destination are superposed. Consequently, the data cannot be extracted from the signal to which the waveform processing is applied, at the terminal station not being the original destination. Accordingly, an effect of allowing ensured data confidentiality while achieving flexible signal transmission control is provided.

Fourth Example Embodiment

Configuration

A fourth example embodiment of the present invention will be described. A submarine branching device according to the fourth example embodiment of the present invention comprises a configuration to be capable of compensating for strength of a WDM signal by use of a dummy signal. Description of a configuration similar to that in another example embodiment of the present invention is omitted in the fourth example embodiment of the present invention.

A configuration example of an optical submarine cable system according to the fourth example embodiment of the present invention is similar to the configuration example of the optical submarine cable system 1000 illustrated in FIG. 1.

A WDM signal input to a submarine branching device 5 from a terminal station 3 may include a dummy signal, according to the fourth example embodiment. A dummy signal is a signal multiplexed onto a band signal on which data are superposed, in order to compensate for signal strength. The submarine branching device according to the fourth example embodiment of the present invention comprises a configuration to multiplex a dummy signal input from the terminal station 3 onto a WDM signal output to the terminal station 3. Consequently, strength of the WDM signal output to the terminal station 3 from the submarine branching device can be compensated for.

Figure 8:
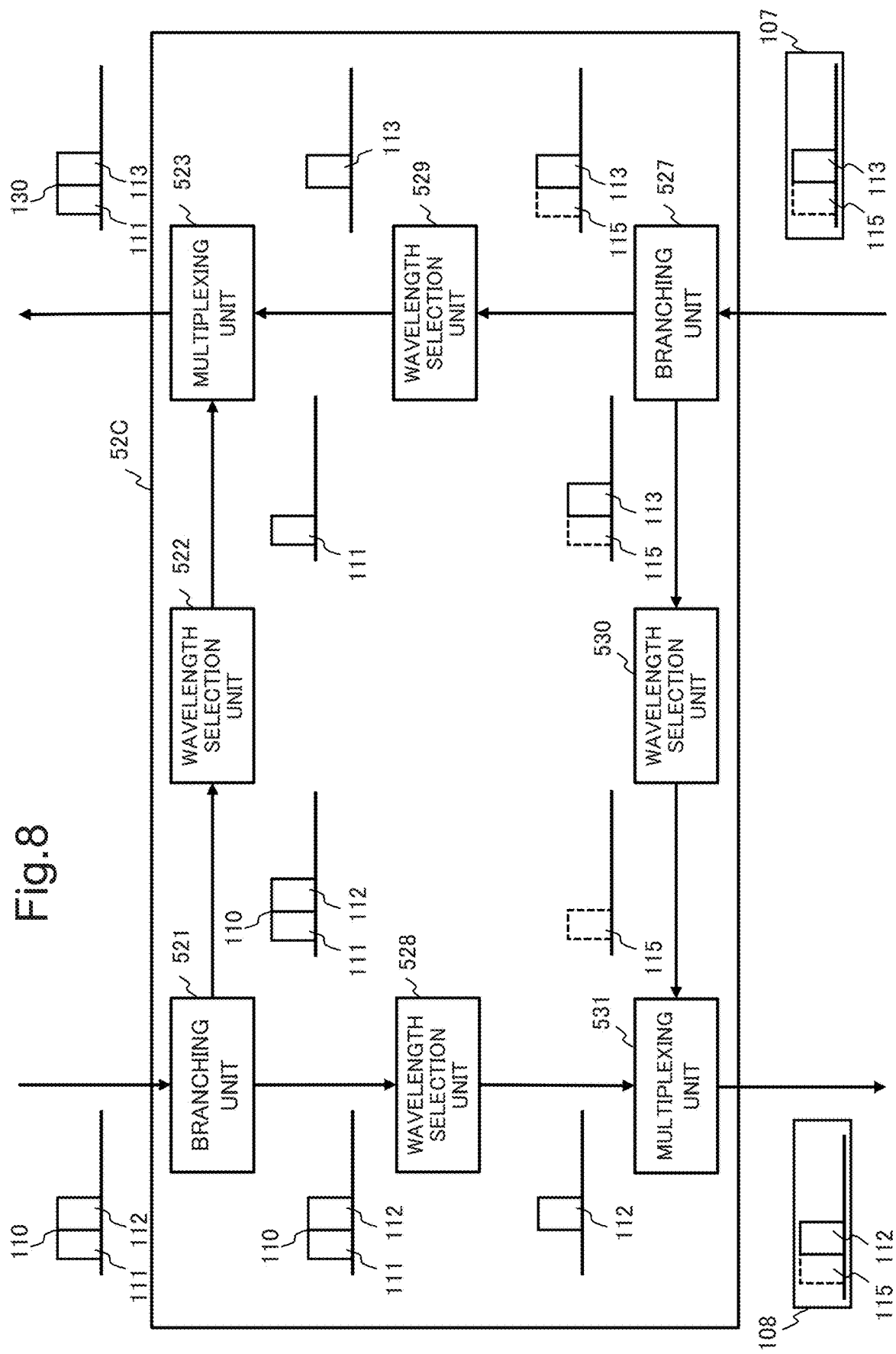
FIG. 8 is a diagram illustrating a configuration example of an optical add/drop unit according to a fourth example embodiment.

Compared with the configuration illustrated in FIG. 2, the submarine branching device according to the fourth example embodiment of the present invention includes an optical add/drop unit 52C in place of the optical add/drop unit 52. FIG. 8 illustrates a configuration example of the optical add/drop unit 52C according to the fourth example embodiment of the present invention. In addition to the configuration illustrated in FIG. 4, the optical add/drop unit 52C includes a branching unit 527, wavelength selection units 528, 529, and 530, and a multiplexing unit 531. A WDM signal 107 input from the terminal station 3 includes a dummy signal 115. A WDM signal 108 output to the terminal station 3 includes the dummy signal 115. The dummy signal 115 may have a wavelength band corresponding to a wavelength band of a band signal 111.

The branching unit 527 branches the WDM signal 107 input from the terminal station 3. The branching unit 527 outputs the branched WDM signals 107 to the wavelength selection units 529 and 530. The branching unit 527 may be an optical coupler.

Each of the wavelength selection units 528, 529, and 530 transmits a signal at a specific wavelength in an input signal. The wavelength selection unit 528 transmits a band signal 112 in a C-band signal 110 input from a branching unit 521. The wavelength selection unit 529 transmits a band signal 113 in a WDM signal input from the branching unit 527. The wavelength selection unit 530 transmits the dummy signal 115 in the WDM signal input from the branching unit 527. Each of the wavelength selection units 528, 529, and 530 may block a band signal not to be transmitted. Further, each of the wavelength selection units 528, 529, and 530 may be an optical filter selectively transmitting a specific wavelength. A wavelength band transmitted by each of the wavelength selection units 528, 529, and 530 may be changeable. A change of a wavelength band may be performed in accordance with control from an unillustrated control device.

The multiplexing unit 531 multiplexes the band signal 112 input from the wavelength selection unit 528 and the dummy signal 115 input from the wavelength selection unit 530 and outputs the WDM signal 108 to the terminal station 3. For example, the multiplexing unit 523 may be an optical coupler.

Operation

Figure 9:
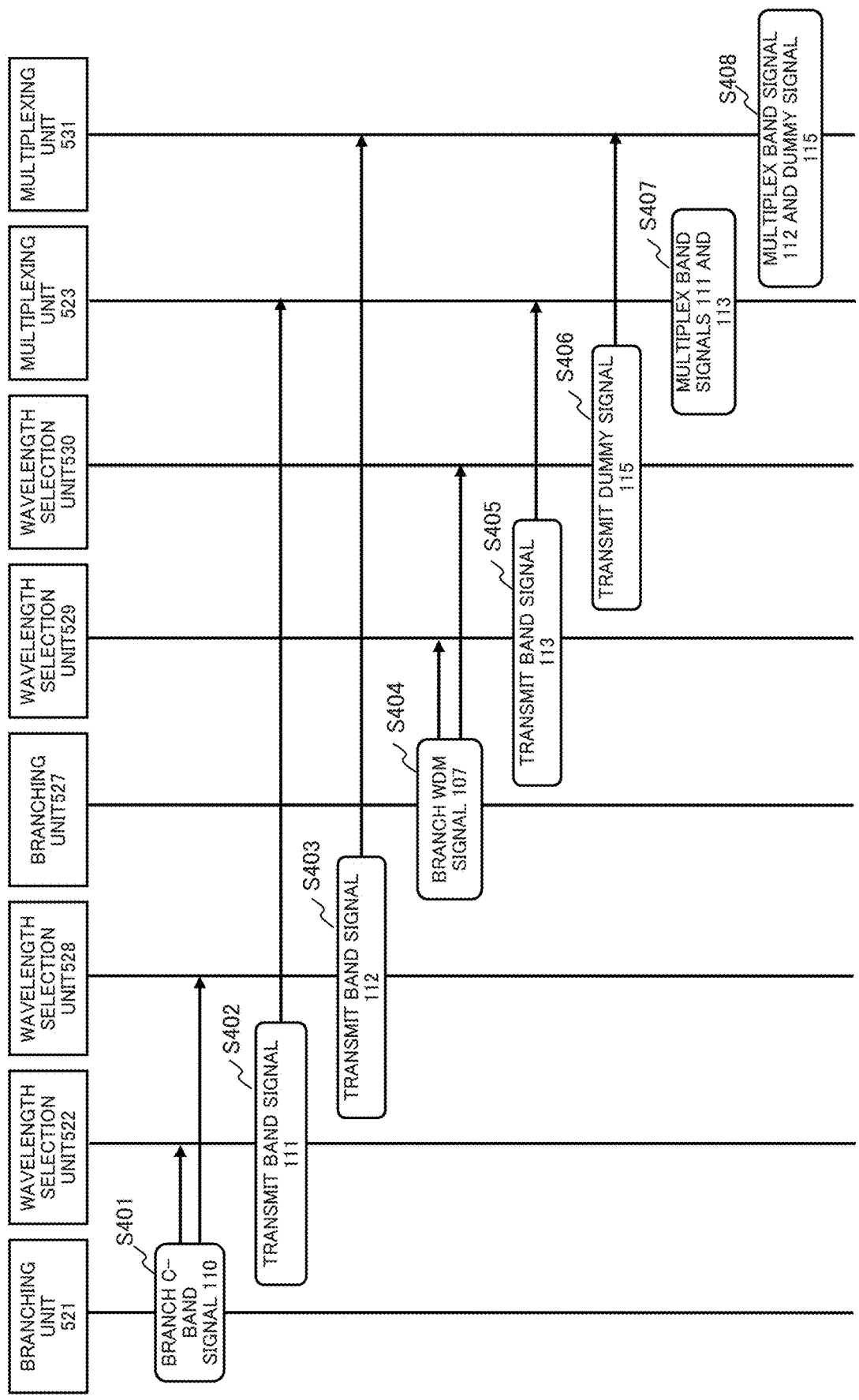
FIG. 9 is a sequence diagram illustrating an operation example of the optical add/drop unit according to the fourth example embodiment.

An operation example of the optical add/drop unit 52C according to the fourth example embodiment will be described below by use of FIG. 9. An operation example of a configuration not illustrated in FIG. 9 is similar to that in the first example embodiment, and therefore description thereof is omitted.

The branching unit 521 branches the C-band signal 110 input from the demultiplexing unit 51 (S401).

The wavelength selection unit 522 transmits the band signal 111 included in the branched C-band signal 110 (S402).

The wavelength selection unit 528 transmits the band signal 112 included in the branched C-band signal 110 (S403).

The branching unit 527 branches the WDM signal 107 input from the terminal station 3 (S404).

The wavelength selection unit 529 transmits the band signal 113 included in the branched WDM signal 107 (S405).

The wavelength selection unit 530 transmits the dummy signal 115 included in the branched WDM signal 107 (S406).

The multiplexing unit 523 multiplexes the band signal 111 and the band signal 113 (S407).

The multiplexing unit 531 multiplexes the band signal 112 and the dummy signal 115 (S408).

Effects

The submarine branching device according to the fourth example embodiment of the present invention comprises a configuration to output a WDM signal onto which an input dummy signal is multiplexed. Consequently, strength of the WDM signal output from the submarine branching device can be compensated for. In this case, even when an optical signal is amplified in a submarine repeater or the like being an output destination, excessive amplification of the optical signal can be prevented by the dummy signal, and by extension, degradation of the optical signal due to a nonlinear effect can be prevented.

Fifth Example Embodiment

Configuration

A fifth example embodiment of the present invention will be described. The submarine branching device according to the fifth example embodiment of the present invention comprises a configuration to add/drop an L-band signal. Description of a configuration similar to that in another example embodiment of the present invention is omitted in the fifth example embodiment of the present invention.

A configuration example of an optical submarine cable system according to the fifth example embodiment of the present invention is similar to the configuration example of the optical submarine cable system 1000 illustrated in FIG. 1.

The submarine branching devices according to the aforementioned example embodiments perform add/drop on a C-band signal. However, the submarine branching devices do not have a function of adding/dropping an L-band signal.

Then, the submarine branching device according to the fifth example embodiment of the present invention comprises a configuration to add/drop an L-band signal. Consequently, flexible transmission control of a WDM signal can be achieved in an optical transmission system using the C-band and the L-band.

Figure 10:
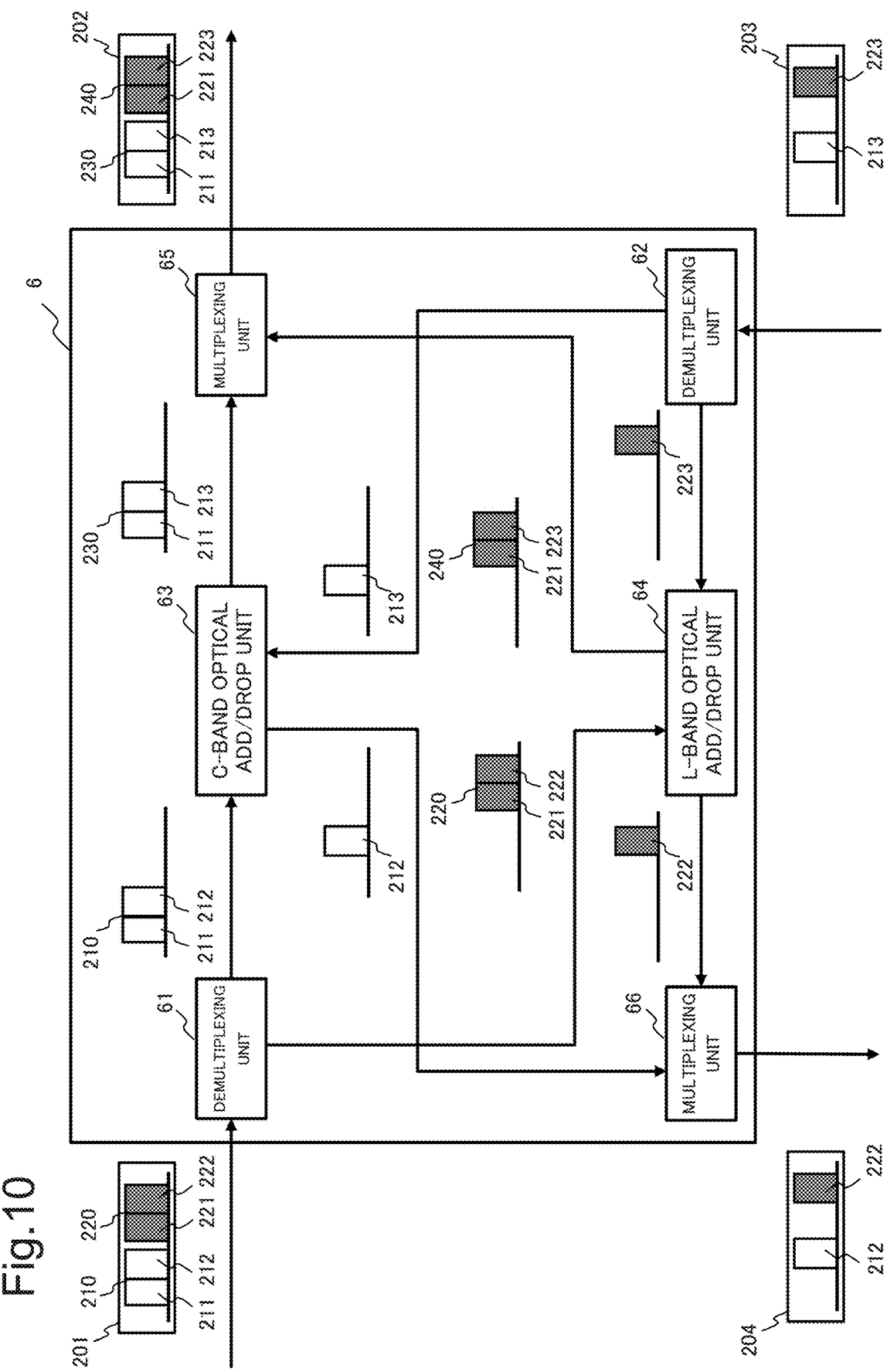
FIG. 10 is a diagram illustrating a configuration example of a submarine branching device according to a fifth example embodiment.

FIG. 10 illustrates a configuration example of the submarine branching device according to the fifth example embodiment of the present invention. The submarine branching device 6 in FIG. 10 includes demultiplexing units 61 and 62, a C-band optical add/drop unit 63, an L-band optical add/drop unit 64, and multiplexing units 65 and 66. A WDM signal 201 output from a terminal station 1 is input to the submarine branching device 6. A WDM signal 203 output from a terminal station 3 is input to the submarine branching device 6.

The demultiplexing unit 61 demultiplexes the WDM signal 201 input from the terminal station 1 into a C-band signal 210 and an L-band signal 220. The demultiplexing unit 61 outputs the C-band signal 210 to the C-band optical add/drop unit 63. The demultiplexing unit 61 outputs the L-band signal 220 to the L-band optical add/drop unit 64.

The demultiplexing unit 62 demultiplexes the WDM signal 203 input from the terminal station 3 into a C-band signal 213 and an L-band signal 223. The demultiplexing unit 61 outputs the C-band signal 213 to the C-band optical add/drop unit 63. The demultiplexing unit 62 outputs the L-band signal 223 to the L-band optical add/drop unit 64.

For example, each of the demultiplexing units 61 and 62 may be a WSS selectively switching a wavelength output to a specific port, an optical filter selectively transmitting or reflecting a specific wavelength, or a combination of an optical coupler and an optical filter selectively transmitting a specific wavelength. A wavelength band demultiplexed by each of the demultiplexing units 61 and 62 may be changeable. A change of a wavelength band may be performed in accordance with control from an unillustrated control device.

The C-band optical add/drop unit 63 performs add/drop on a C-band signal. The C-band optical add/drop unit 63 outputs a band signal 212 included in the C-band signal 210 input from the demultiplexing unit 61 to the multiplexing unit 66. Further, the C-band optical add/drop unit 63 multiplexes a band signal 211 included in the C-band signal 210 and the C-band signal 213 and outputs a C-band signal 230 to the multiplexing unit 65.

The L-band optical add/drop unit 64 performs add/drop on an L-band signal. The L-band optical add/drop unit 64 outputs a band signal 222 in the L-band signal 220 input from the demultiplexing unit 61 to the multiplexing unit 66. Further, the L-band optical add/drop unit 64 multiplexes a band signal 221 in the L-band signal 220 input from the demultiplexing unit 61 and the L-band signal 223 input from the demultiplexing unit 62 and outputs an L-band signal 240 to the multiplexing unit 65.

The multiplexing unit 65 multiplexes the C-band signal 230 input from the C-band optical add/drop unit 63 and the L-band signal 240 input from the L-band optical add unit and outputs the multiplexed signal to a terminal station 2 as a WDM signal 202.

The multiplexing unit 66 multiplexes the band signal 212 input from the C-band optical add/drop unit 63 and the band signal 222 input from the L-band optical add/drop unit 64 and outputs the multiplexed signal to the terminal station 3 as a WDM signal 204.

Operation

Figure 11:
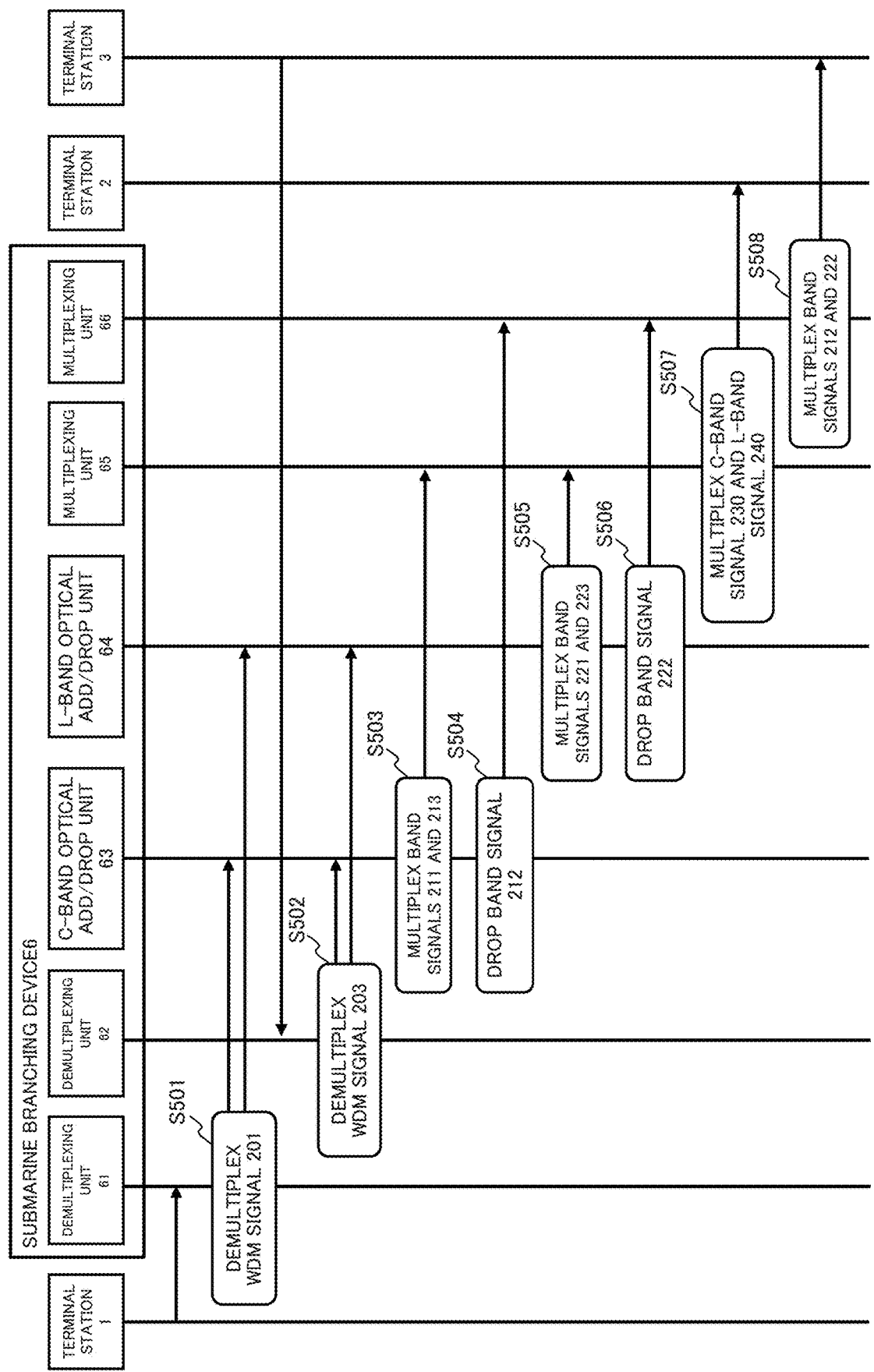
FIG. 11 is a sequence diagram illustrating an operation example of the submarine branching device according to the fifth example embodiment.

An operation example of the submarine branching device according to the fifth example embodiment will be described below by use of FIG. 11.

The demultiplexing unit 61 demultiplexes the WDM signal 201 input from the terminal station 1 into the C-band signal 210 and the L-band signal 220 (S501).

The demultiplexing unit 62 demultiplexes the WDM signal 203 input from the terminal station 3 into the C-band signal 213 and the L-band signal 223 (S502).

The C-band optical add/drop unit 63 multiplexes the band signal 211 included in the C-band signal 210 and the C-band signal 213 and outputs the C-band signal 230 to the multiplexing unit 65 (S503).

Further, the C-band optical add/drop unit 63 drops the band signal 212 included in the C-band signal 210 input from the demultiplexing unit 61 and outputs the band signal 212 to the multiplexing unit 66 (S504).

The L-band optical add/drop unit 64 multiplexes the band signal 221 in the L-band signal 220 input from the demultiplexing unit 61 and the band signal 223 input from the demultiplexing unit 62 and outputs the L-band signal 240 to the multiplexing unit 65 (S505).

Further, the L-band optical add/drop unit 64 drops the band signal 222 in the L-band signal 220 input from the demultiplexing unit 61 and outputs the band signal 222 to the multiplexing unit 66 (S506).

The multiplexing unit 65 multiplexes the C-band signal 230 input from the C-band optical add/drop unit 63 and the L-band signal 240 input from the L-band optical add unit and outputs the WDM signal 202 to the terminal station 2 (S507).

The multiplexing unit 66 multiplexes the band signal 212 input from the C-band optical add/drop unit 63 and the band signal 222 input from the L-band optical add/drop unit 64 and outputs the WDM signal 204 to the terminal station 3 (S508).

Effects

The submarine branching device according to the present example embodiment performs add/drop on each of a C-band signal and an L-band signal. Accordingly, a submarine branching device capable of flexible transmission control on a per-wavelength basis in an optical transmission system using the C-band and the L-band can be provided.

Sixth Example Embodiment

Configuration

A sixth example embodiment of the present invention will be described. A submarine branching device according to the sixth example embodiment of the present invention comprises a configuration to be capable of controlling an output destination of a signal in response to occurrence of a failure. Description of a configuration similar to that in another example embodiment of the present invention is omitted in the sixth example embodiment of the present invention.

Figure 12:
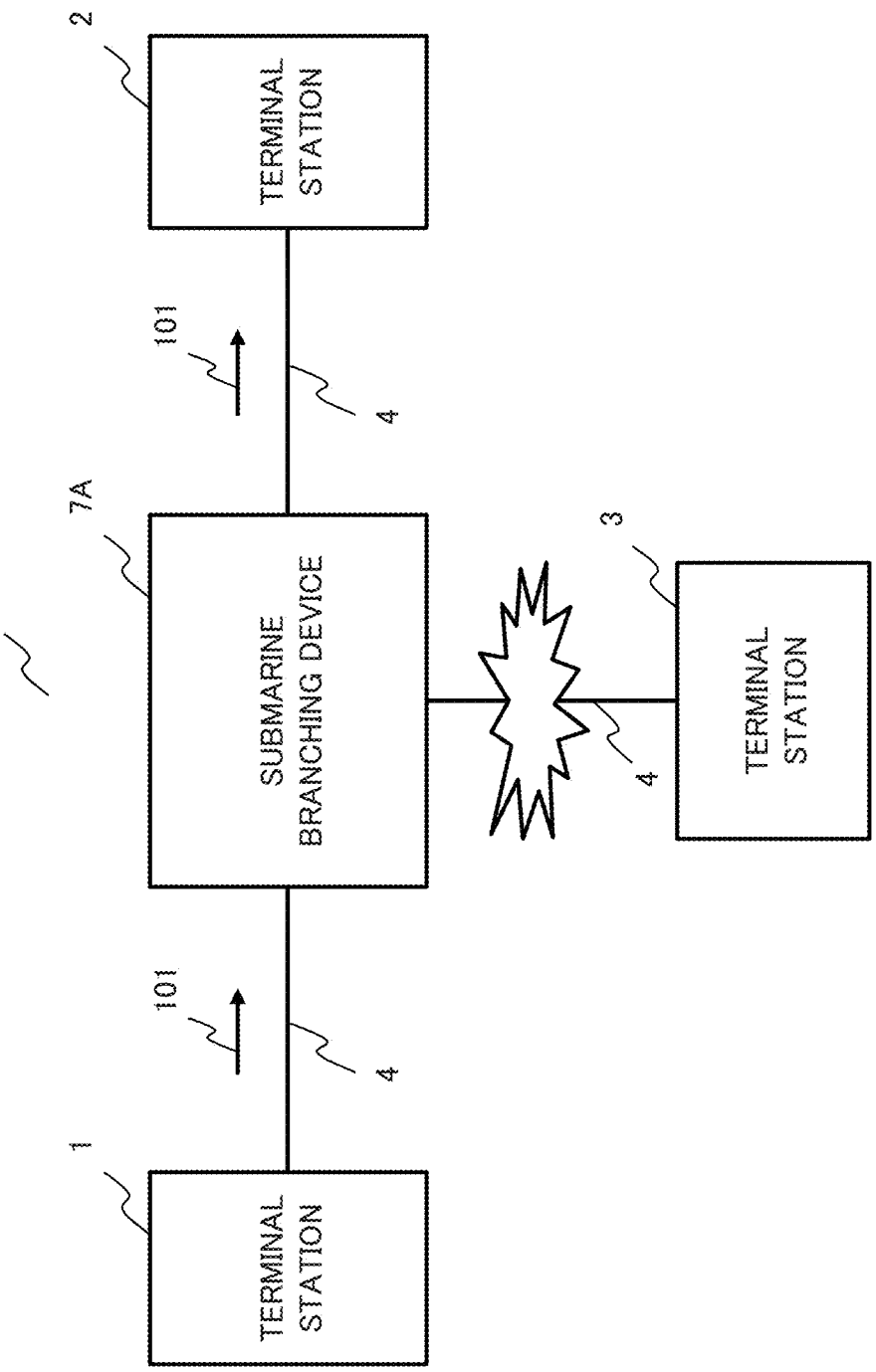
FIG. 12 is a diagram illustrating a configuration example of an optical submarine cable system according to a sixth example embodiment.

FIG. 12 illustrates a configuration example of an optical submarine cable system according to the sixth example embodiment of the present invention. Compared with the configuration illustrated in FIG. 1, the optical submarine cable system 2000 illustrated in FIG. 12 includes a submarine branching device 7A in place of the submarine branching device 5. FIG. 12 illustrates a configuration example in a case of a failure occurring on a transmission line through an optical submarine cable 4 between a terminal station 3 and the submarine branching device 7A. A configuration example under normal operation is similar to the configuration example illustrated in FIG. 1. As illustrated in FIG. 12, in response to occurrence of a failure, the submarine branching device 7A controls an output destination of a WDM signal and outputs a WDM signal 101 input from a terminal station 1 to a terminal station 2.

Figure 13:
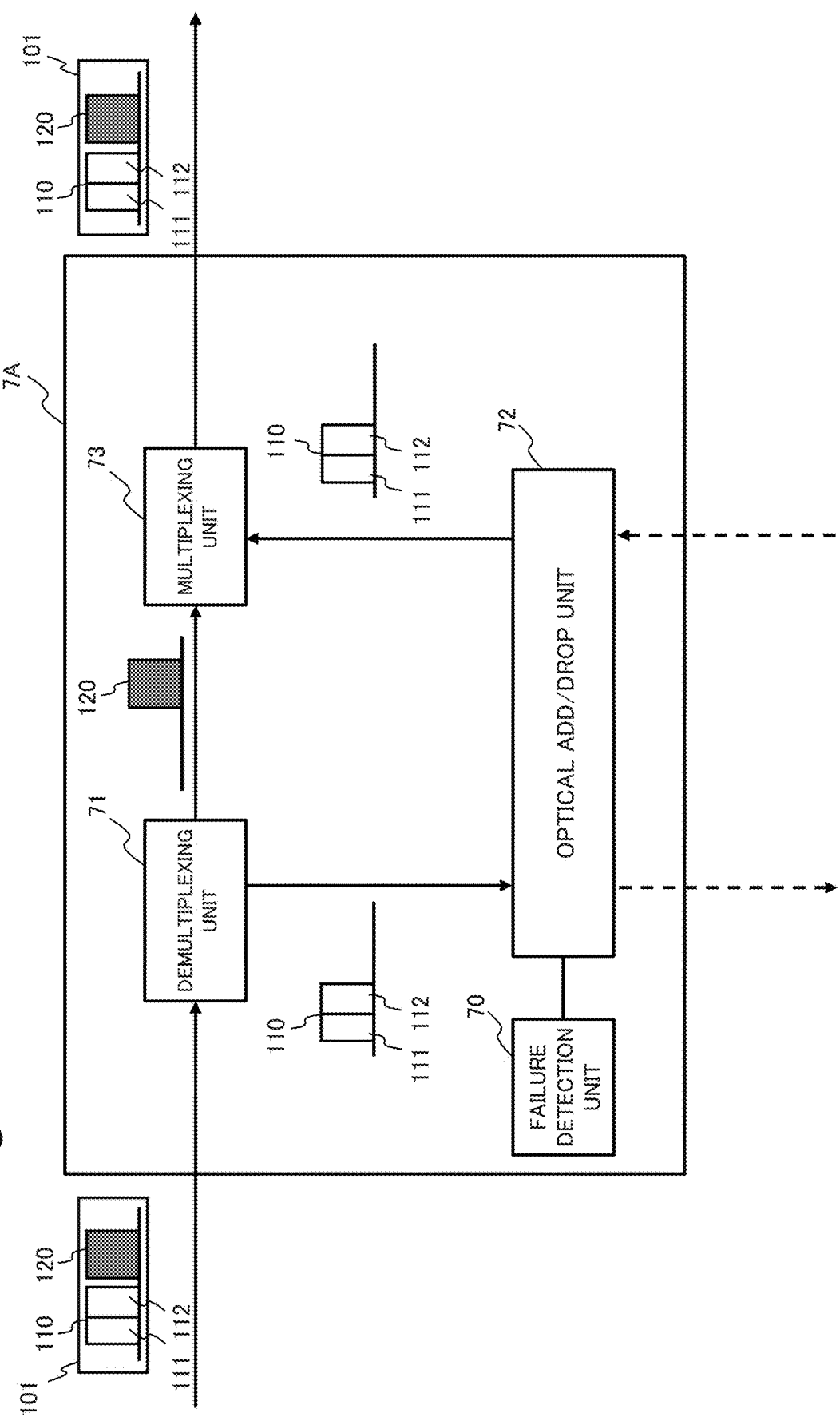
FIG. 13 is a diagram illustrating a configuration example of a submarine branching device according to the sixth example embodiment.

FIG. 13 illustrates a configuration example of the submarine branching device 7A according to the sixth example embodiment of the present invention. The submarine branching device 7A includes a failure detection unit 70, a demultiplexing unit 71, an optical add/drop unit 72, and a multiplexing unit 73. A solid arrow in FIG. 13 indicates a signal flow in the case of a failure occurring on the transmission line through the optical submarine cable 4 between the terminal station 3 and the submarine branching device 7A. A signal flow under normal operation is similar to the configuration example illustrated in FIG. 2. A broken arrow in FIG. 13 indicates a signal flow between the terminal station 3 and the submarine branching device 7A under normal operation.

The demultiplexing unit 71 and the multiplexing unit 73 are similar to the demultiplexing unit 51 and the multiplexing unit 53 in FIG. 2, respectively, and therefore detailed description thereof is omitted.

The failure detection unit 70 detects a failure on the transmission line through the optical submarine cable 4 between the terminal station 3 and the submarine branching device 7A. The failure detection unit 70 may also detect a failure on a transmission line between another terminal station and the submarine branching device. Further, in response to detection of a failure, the failure detection unit 70 instructs the optical add/drop unit 72 to change a wavelength band to be multiplexed and demultiplexed. The failure detection unit 70 may monitor a WDM signal input to the submarine branching device 7A and detect a failure on the transmission line in response to signal quality degradation or signal interruption of the monitored WDM signal. The failure detection unit 70 may detect a failure by receiving failure occurrence information from a terminal station or another submarine branching device. In place of the failure detection unit 70, an unillustrated monitor unit may detect a failure on the transmission line. In this case, the failure detection unit 70 issues an instruction to the optical add/drop unit 72 in response to detection of a failure by the monitor unit.

The optical add/drop unit 72 has a function of being capable of changing a wavelength band to be multiplexed and demultiplexed. In response to occurrence of a failure, the optical add/drop unit 72 changes a wavelength band to be multiplexed and demultiplexed and switches an output destination of a signal. The optical add/drop unit 72 outputs a C-band signal 110 input from the demultiplexing unit 71 to the multiplexing unit 73.

Operation

Figure 14:
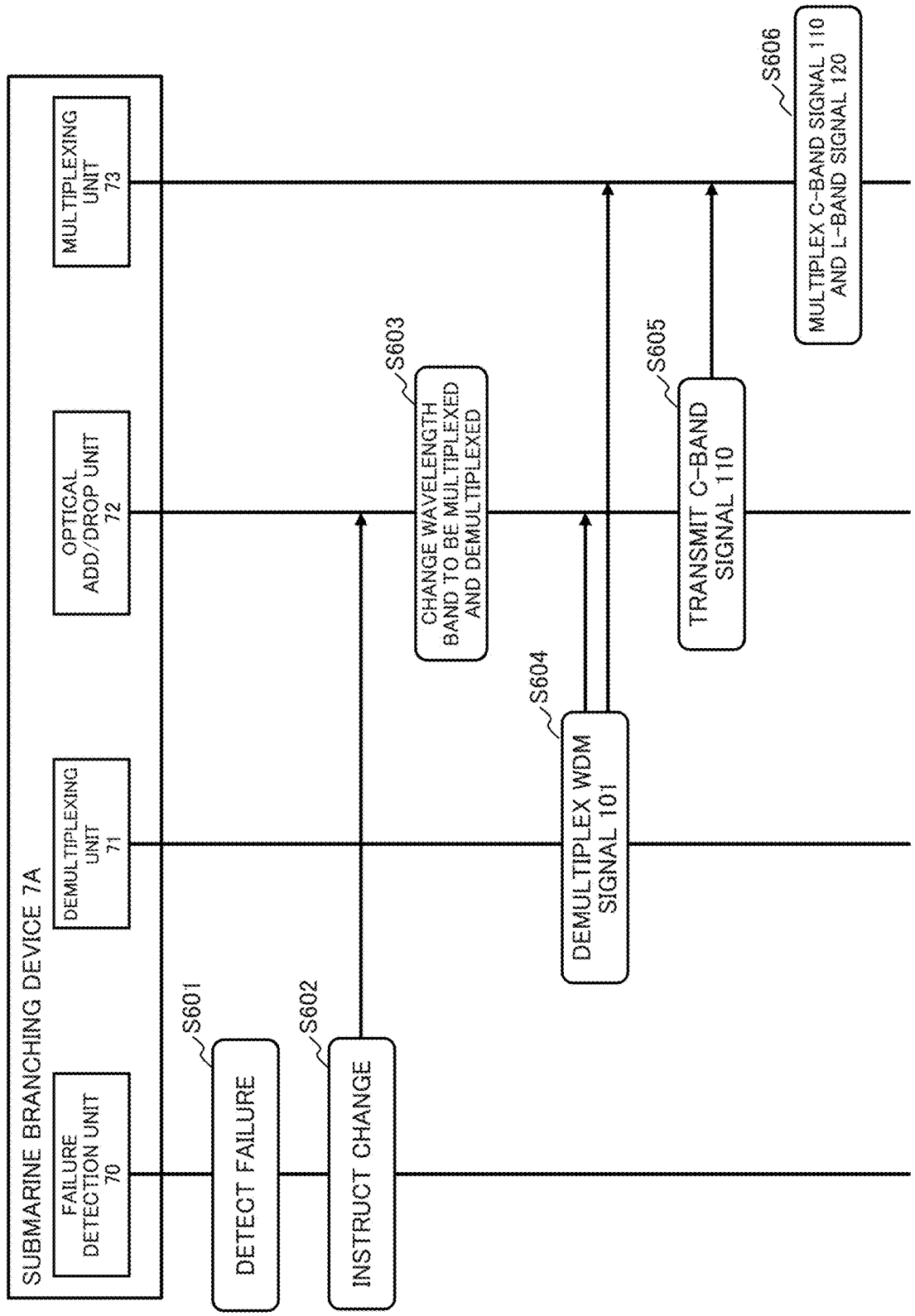
FIG. 14 is a sequence diagram illustrating an operation example of the submarine branching device according to the sixth example embodiment.

An operation example of the submarine branching device 7A according to the sixth example embodiment at occurrence of a failure will be described below by use of FIG. 14. An operation example of the submarine branching device 7A under normal operation is similar to the operation example illustrated in FIG. 3.

The failure detection unit 70 detects a failure on the transmission line through the optical submarine cable 4 between the terminal station 3 and the submarine branching device 7A (S601).

In response to the detection of the failure, the failure detection unit 70 instructs the optical add/drop unit 72 to change a wavelength band to be multiplexed and demultiplexed (S602).

In accordance with the instruction from the failure detection unit 70, the optical add/drop unit 72 changes a wavelength band to be multiplexed and demultiplexed (S603).

The demultiplexing unit 71 demultiplexes the WDM signal 101 (S604).

The optical add/drop unit 72 transmits the C-band signal 110 input from the demultiplexing unit 71 and outputs the C-band signal 110 to the multiplexing unit 73 (S605).

The multiplexing unit 73 multiplexes the C-band signal 110 and an L-band signal 120 and outputs the WDM signal 101 to the terminal station 2 (S606).

Effects

The submarine branching device according to the present example embodiment comprises a configuration to be capable of controlling an output destination of a signal in response to occurrence of a failure. Accordingly, a submarine branching device being capable of providing an optical transmission system using the C-band and the L-band and also being capable of handling occurrence of a failure can be provided.

Seventh Example Embodiment

Configuration

A Seventh example embodiment of the present invention will be described. A submarine branching device according to the seventh example embodiment of the present invention comprise a configuration to be capable of controlling an output destination of a signal in response to occurrence of a failure. The submarine branching device further comprises a configuration to be capable of ensuring data confidentiality. Description of a configuration similar to that in another example embodiment of the present invention is omitted in the seventh example embodiment of the present invention.

Compared with the configuration illustrated in FIG. 12, an optical submarine cable system according to the seventh example embodiment of the present invention includes a submarine branching device 7B in place of the submarine branching device 7A.

The submarine branching device 7A according to the aforementioned sixth example embodiment of the present invention outputs the WDM signal 101 including the band signal 112 to the terminal station 2. Data to be received by the terminal station 3 may be superposed on the band signal 112, but at this time, the band signal 112 is output to the terminal station 2 not being an original destination.

Then, the submarine branching device 7B according to the seventh example embodiment of the present invention performs predetermined waveform processing on a band signal on which data to be received by the terminal station 3 are superposed. Consequently, even when a signal is output to a terminal station not being an original destination, data confidentiality can be ensured.

Figure 15:
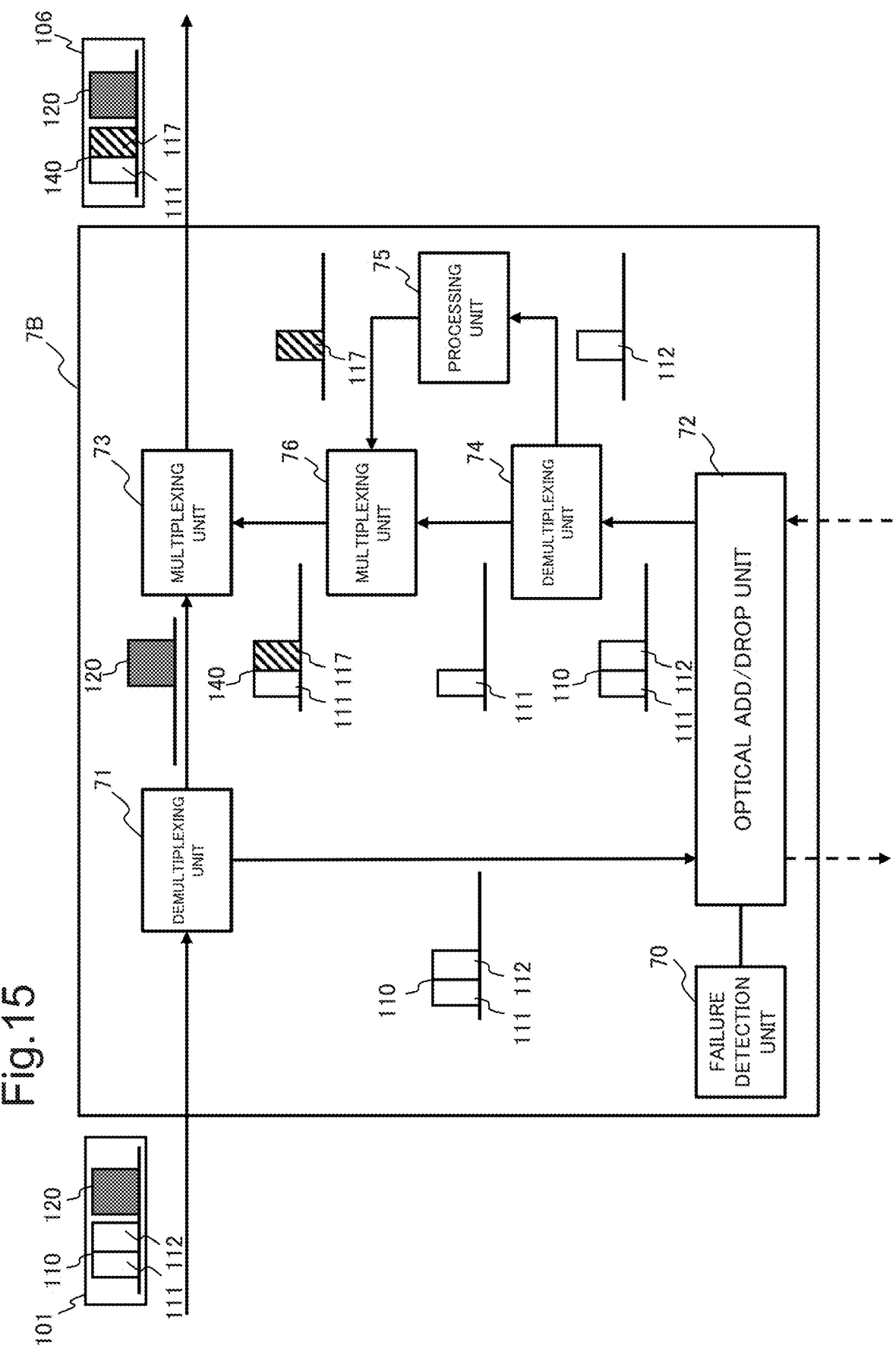
FIG. 15 is a diagram illustrating a configuration example of a submarine branching device according to a seventh example embodiment.

FIG. 15 illustrates a configuration example of the submarine branching device 7B according to the seventh example embodiment. In addition to the configuration of the submarine branching device 7A in FIG. 13, the submarine branching device 7B in FIG. 15 includes a demultiplexing unit 74, a processing unit 75, and a multiplexing unit 76. A solid arrow in FIG. 15 indicates a signal flow in a case of a failure occurring on a transmission line through an optical submarine cable 4 between the terminal station 3 and the submarine branching device 7B. A signal flow under normal operation is similar to the configuration example illustrated in FIG. 2. A broken arrow in FIG. 15 indicates a signal flow between the terminal station 3 and the submarine branching device 7B under normal operation.

The demultiplexing unit 74 demultiplexes a C-band signal 110 input from an optical add/drop unit 72 into a band signal 111 and a band signal 112. For example, the demultiplexing unit 74 may be a WSS selectively switching a wavelength output to a specific port, an optical filter selectively transmitting or reflecting a specific wavelength, or a combination of an optical coupler and an optical filter selectively transmitting a specific wavelength. A wavelength band demultiplexed by the demultiplexing unit 74 may be changeable. A change of a wavelength band may be performed in accordance with control from an unillustrated control device or may be performed in response to detection of a failure by the failure detection unit 70.

The processing unit 75 generates a processed signal 117 by applying predetermined waveform processing to the band signal 112 input from the demultiplexing unit 74. The processing unit 75 outputs the processed signal 117 to the multiplexing unit 76. As the predetermined waveform processing, the processing unit 75 may add a predetermined pattern to the band signal 112. For example, the predetermined pattern may be a dummy pattern in which 0 and 1 are randomly arranged or a fixed pattern in which 0 and 1 are arranged in a specific pattern. Further, as the predetermined waveform processing, the processing unit 75 may perform scrambling processing on the band signal 112. Further, as the predetermined waveform processing, the processing unit 75 may degrade a transmission characteristic of the band signal 112. Furthermore, the processing unit 75 may delay the band signal 111 and cause the multiplexing unit 76 to multiplex the delayed signal as a delayed optical signal. The predetermined waveform processing executed by the processing unit 75 may be changeable. A change of the waveform processing may be performed in accordance with control from an unillustrated control device or may be performed in response to detection of a failure by the failure detection unit 70.

The multiplexing unit 76 multiplexes the band signal 111 and the processed signal 117 and outputs the multiplexed signal to the multiplexing unit 73. The multiplexing unit 76 may be an optical coupler.

Operation

Operations of the demultiplexing unit 74, the processing unit 75, and the multiplexing unit 76, according to the seventh example embodiment, are similar to the operation example illustrated in FIG. 7. In this case, the demultiplexing unit 74, the processing unit 75, and the multiplexing unit 76 correspond to the demultiplexing unit 524, the processing unit 525, and the multiplexing unit 526, respectively.

Effects

The optical add/drop unit according to the present example embodiment comprises a configuration to apply predetermined waveform processing to a signal on which data output to a terminal station not being an original destination are superposed, when changing an output destination of a signal in response to occurrence of a failure. Consequently, the data cannot be extracted from the signal to which the waveform processing is applied, at the terminal station not being the original destination. Accordingly, an effect of allowing ensured data confidentiality while achieving flexible signal transmission control is provided.

Eighth Example Embodiment

An eighth example embodiment of the present invention will be described. A submarine branching device according to the eighth example embodiment of the present invention comprises a configuration to be capable of controlling an output destination of a signal in response to occurrence of a failure. Description of a configuration similar to that in another example embodiment of the present invention is omitted in the eighth example embodiment of the present invention.

Figure 16:
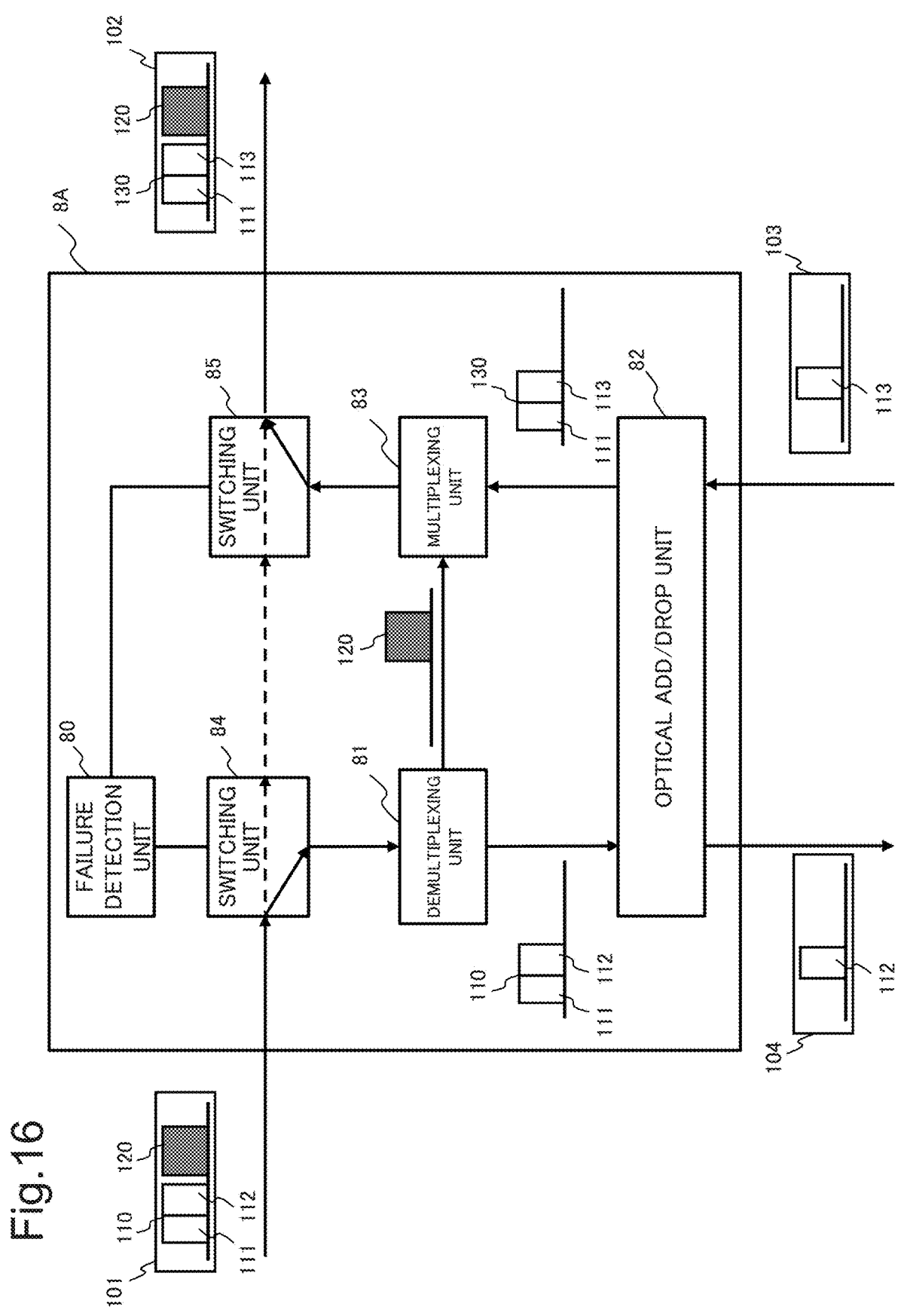
FIG. 16 is a diagram illustrating a configuration example of a submarine branching device according to an eighth example embodiment.

Compared with the configuration illustrated in FIG. 12, an optical submarine cable system according to the eighth example embodiment of the present invention includes a submarine branching device 8A in place of the submarine branching device 7A. FIG. 16 illustrates a configuration example of the submarine branching device 8A according to the eighth example embodiment of the present invention. In addition to the configuration illustrated in FIG. 2, the submarine branching device 8A includes a failure detection unit 80, a demultiplexing unit 81, an optical add/drop unit 82, a multiplexing unit 83, and switching units 84 and 85. A solid arrow in FIG. 16 indicates a signal flow under normal operation.

The demultiplexing unit 81, the optical add/drop unit 82, and the multiplexing unit 83 are similar to the demultiplexing unit 51, the optical add/drop unit 52, and the multiplexing unit 53 in FIG. 2, respectively, and therefore detailed description thereof is omitted. The optical add/drop unit 82 may also be similar to the optical add/drop unit 72 in FIG. 13.

The failure detection unit 80 detects a failure on a transmission line through an optical submarine cable 4 between a terminal station 3 and the submarine branching device 8A. The failure detection unit 80 may also detect a failure on a transmission line between another terminal station and the submarine branching device. Further, the failure detection unit 80 instructs the switching units 84 and 85 to switch signal paths in response to detection of a failure. The failure detection unit 80 may monitor a WDM signal input to the submarine branching device 8A and detect a failure on the transmission line in response to signal quality degradation or signal interruption of the monitored WDM signal. Further, the failure detection unit 80 may detect a failure by receiving failure occurrence information from a terminal station or another submarine branching device. When the submarine branching device 8A receives power supply from at least one of terminal stations 1, 2, and 3, a failure may be detected in response to interruption of the power supply. In place of the failure detection unit 80, an unillustrated monitor unit may detect a failure on the transmission line. In this case, the failure detection unit 80 issues an instruction to the switching units 84 and 85 in response to detection of a failure by the monitor unit.

The switching unit 84 outputs a WDM signal 101 input from the terminal station 1 to the demultiplexing unit 81. The switching unit 85 outputs a WDM signal 102 input from the multiplexing unit 83 to the terminal station 2.

Figure 17:
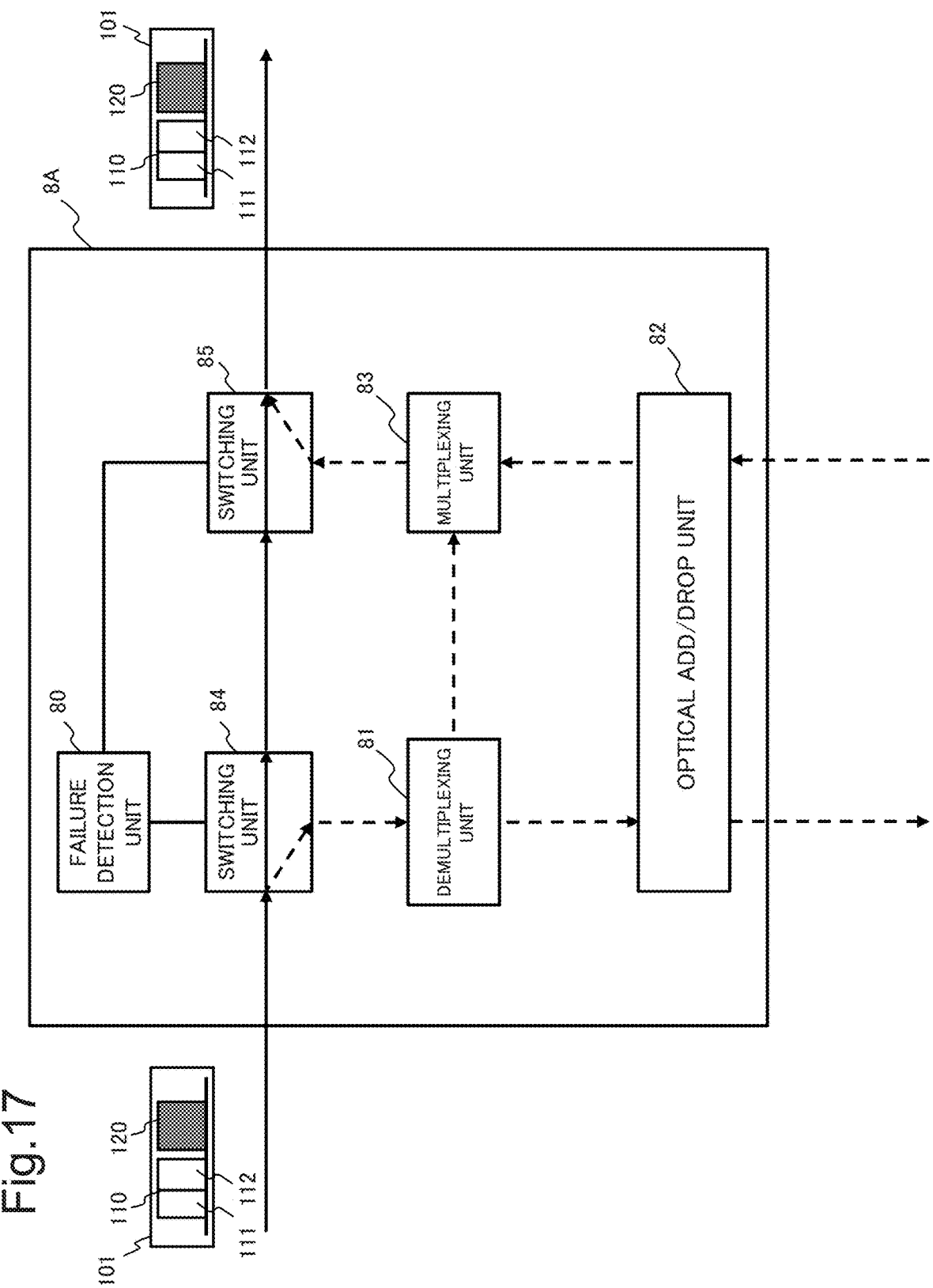
FIG. 17 is a diagram illustrating a configuration example of the submarine branching device according to the eighth example embodiment.

The switching units 84 and 85 switch signal paths in accordance with an instruction from the failure detection unit 80. FIG. 17 illustrates a configuration example of the submarine branching device 8A in a case of the switching units 84 and 85 switching the signal paths. A solid arrow in FIG. 17 indicates a signal flow in the case of the switching units 84 and 85 switching the signal paths. The switching unit 84 switches the signal path and outputs the WDM signal 101 input from the terminal station 1 to the switching unit 85. The switching unit 85 switches the signal path and outputs the WDM signal 101 input from the switching unit 84 to the terminal station 2.

Operation

An operation example of the submarine branching device 8A according to the present example embodiment will be described by use of FIG. 18. An operation example of the submarine branching device 8A under normal operation is similar to the operation example illustrated in FIG. 3.

The failure detection unit 80 detects a failure on the transmission line through the optical submarine cable 4 between the terminal station 3 and the submarine branching device 8A (S801).

In response to the detection of the failure, the failure detection unit 80 instructs the switching units 84 and 85 to switch the signal paths (S802).

The switching unit 84 switches the signal path (S803).

The switching unit 85 switches the signal path (S804). An order in which S803 and S804 are executed is not limited. For example, S803 may be executed after S804 is executed, or S803 and S804 may be executed simultaneously.

The switching unit 84 outputs the WDM signal 101 input from the terminal station 1 to the switching unit 85 (S805).

The switching unit 85 outputs the WDM signal 101 input from the switching unit 84 to the terminal station 2 (S806).

Effects

The submarine branching device according to the present example embodiment comprises a configuration to be capable of controlling an output destination of a signal in response to occurrence of a failure. Accordingly, a submarine branching device being capable of providing an optical transmission system using the C-band and the L-band and also being capable of handling occurrence of a failure can be provided.

Ninth Example Embodiment

Configuration

A ninth example embodiment of the present invention will be described. A submarine branching device according to the ninth example embodiment of the present invention comprises a configuration to be capable of controlling an output destination of a signal in response to occurrence of a failure. The submarine branching device further comprises a configuration to ensure data confidentiality. Description of a configuration similar to that in another example embodiment of the present invention is omitted in the ninth example embodiment of the present invention.

Compared with the configuration illustrated in FIG. 12, an optical submarine cable system according to the ninth example embodiment of the present invention includes a submarine branching device 8B in place of the submarine branching device 7A.

The submarine branching device 8A according to the aforementioned eighth example embodiment of the present invention outputs the WDM signal 101 included in the band signal 112 to the terminal station 2. Data received by the terminal station 3 may be superposed on the band signal 112, but at this time, the band signal 112 is output to the terminal station 2 not being an original destination.

Then, the submarine branching device 8B according to the ninth example embodiment of the present invention performs predetermined waveform processing on a band signal on which data to be received by the terminal station 3 are superposed. Consequently, even when a signal is output to a terminal station not being an original destination, data confidentiality can be ensured.

Figure 19:
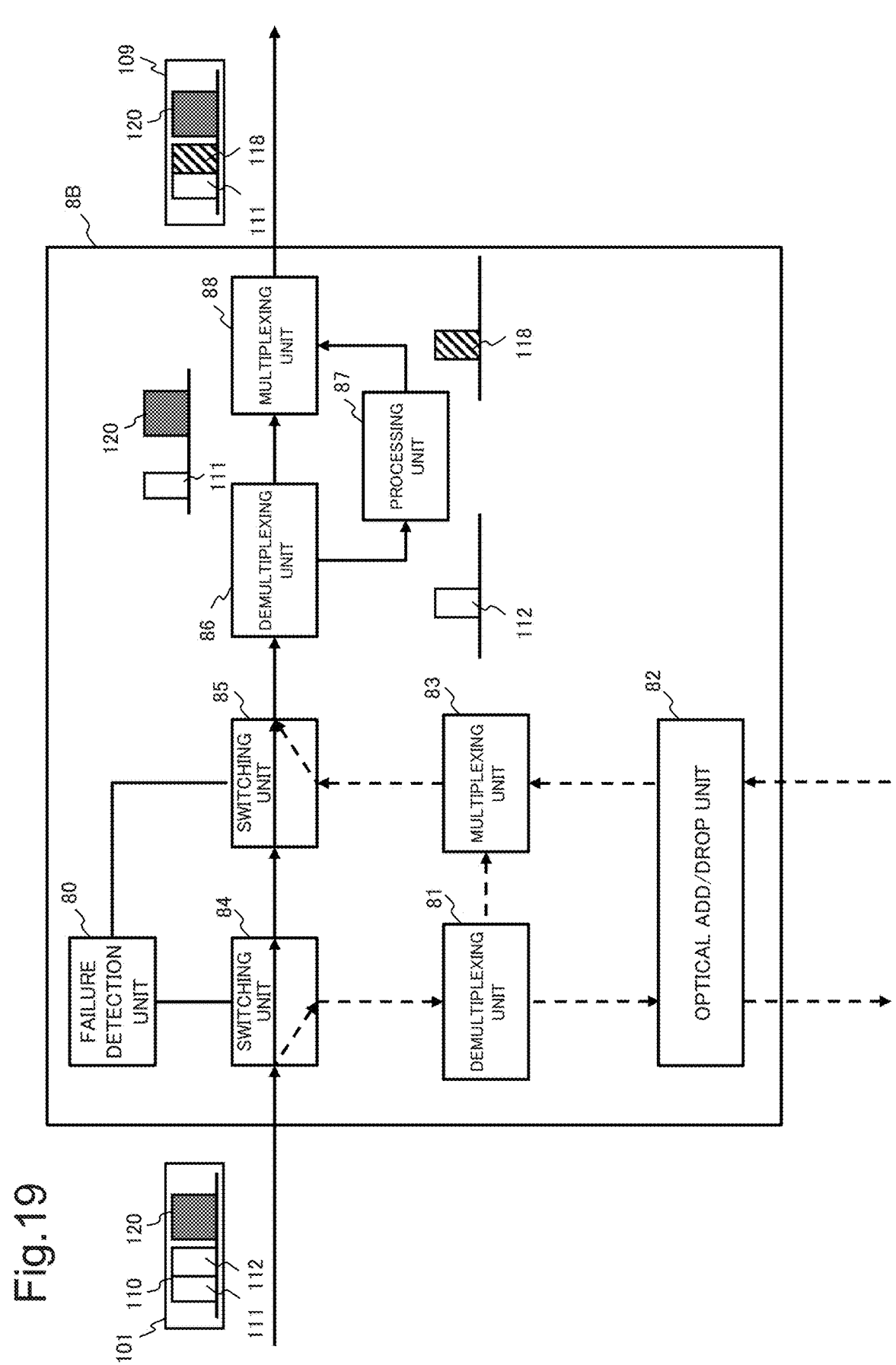
FIG. 19 is a diagram illustrating a configuration example of a submarine branching device according to a ninth example embodiment.

FIG. 19 illustrates a configuration example of the submarine branching device 8B according to the ninth example embodiment. In addition to the configuration of the submarine branching device 8A in FIG. 16, the submarine branching device 8B in FIG. 19 includes a demultiplexing unit 86, a processing unit 87, and a multiplexing unit 88. A solid arrow in FIG. 19 indicates a signal flow in a case of switching units 84 and 85 switching signal paths, and a broken arrow indicates a signal flow before the switching units 84 and 85 switch the signal paths.

The demultiplexing unit 86 demultiplexes a WDM signal 101 input from the switching unit 85. The demultiplexing unit 86 outputs a band signal 112 to the processing unit 87 and outputs a band signal 111 and an L-band signal 120 to the multiplexing unit 88. For example, the demultiplexing unit 86 may be a WSS selectively switching a wavelength output to a specific port, an optical filter selectively transmitting or reflecting a specific wavelength, or a combination of an optical coupler and an optical filter selectively transmitting a specific wavelength. A wavelength band demultiplexed by the demultiplexing unit 86 may be changeable. A change of a wavelength band may be performed in accordance with control from an unillustrated control device.

The processing unit 87 generates a processed signal 118 by applying predetermined waveform processing to the band signal 112 input from the demultiplexing unit 86. The processing unit 87 outputs the processed signal 118 to the multiplexing unit 88. As the predetermined waveform processing, the processing unit 87 may add a predetermined pattern to the band signal 112. For example, the predetermined pattern may be a dummy pattern in which 0 and 1 are randomly arranged or a fixed pattern in which 0 and 1 are arranged in a specific pattern. Further, as the predetermined waveform processing, the processing unit 87 may perform scrambling processing on the band signal 112. Furthermore, the processing unit 87 may delay the band signal 111 and cause the multiplexing unit 88 to multiplex the delayed signal as a delayed optical signal. Further, as the predetermined waveform processing, the processing unit 87 may degrade a transmission characteristic of the band signal 112. The predetermined waveform processing executed by the processing unit 87 may be changeable. A change of the waveform processing may be performed in accordance with control from an unillustrated control device or may be performed in response to detection of a failure by the failure detection unit 80.

The multiplexing unit 88 multiplexes the band signal 111 and the L-band signal 120 that are input from the demultiplexing unit 86, and the processed signal 118 input from the processing unit 87 and outputs a WDM signal 109 to the terminal station 2. The multiplexing unit 88 may be an optical coupler.

Operation

Operations of the demultiplexing unit 86, the processing unit 87, and the multiplexing unit 88 in this example are similar to the operation example illustrated in FIG. 7. In this case, the demultiplexing unit 86, the processing unit 87, and the multiplexing unit 88 correspond to the demultiplexing unit 524, the processing unit 525, and the multiplexing unit 526, respectively.

Effects

The optical add/drop unit according to the present example embodiment comprises a configuration to apply predetermined waveform processing to a signal on which data output to a terminal station not being an original destination are superposed, when changing an output destination of a signal in response to occurrence of a failure. Consequently, the data cannot be extracted from the signal to which the waveform processing is applied, at the terminal station not being the original destination. Accordingly, an effect of allowing ensured data confidentiality while achieving flexible signal transmission control is provided.

Tenth Example Embodiment

Configuration

A tenth example embodiment of the present invention will be described. A submarine branching device according to the tenth example embodiment of the present invention comprises a configuration to be capable of switching control of a signal path in response to occurrence of a failure. The submarine branching device according to the tenth example embodiment of the present invention further comprises a configuration to be capable of outputting an optical signal without causing traffic interruption due to switching control of a signal path. Description of a configuration similar to that in another example embodiment of the present invention is omitted, in the tenth example embodiment of the present invention.

Figure 20:
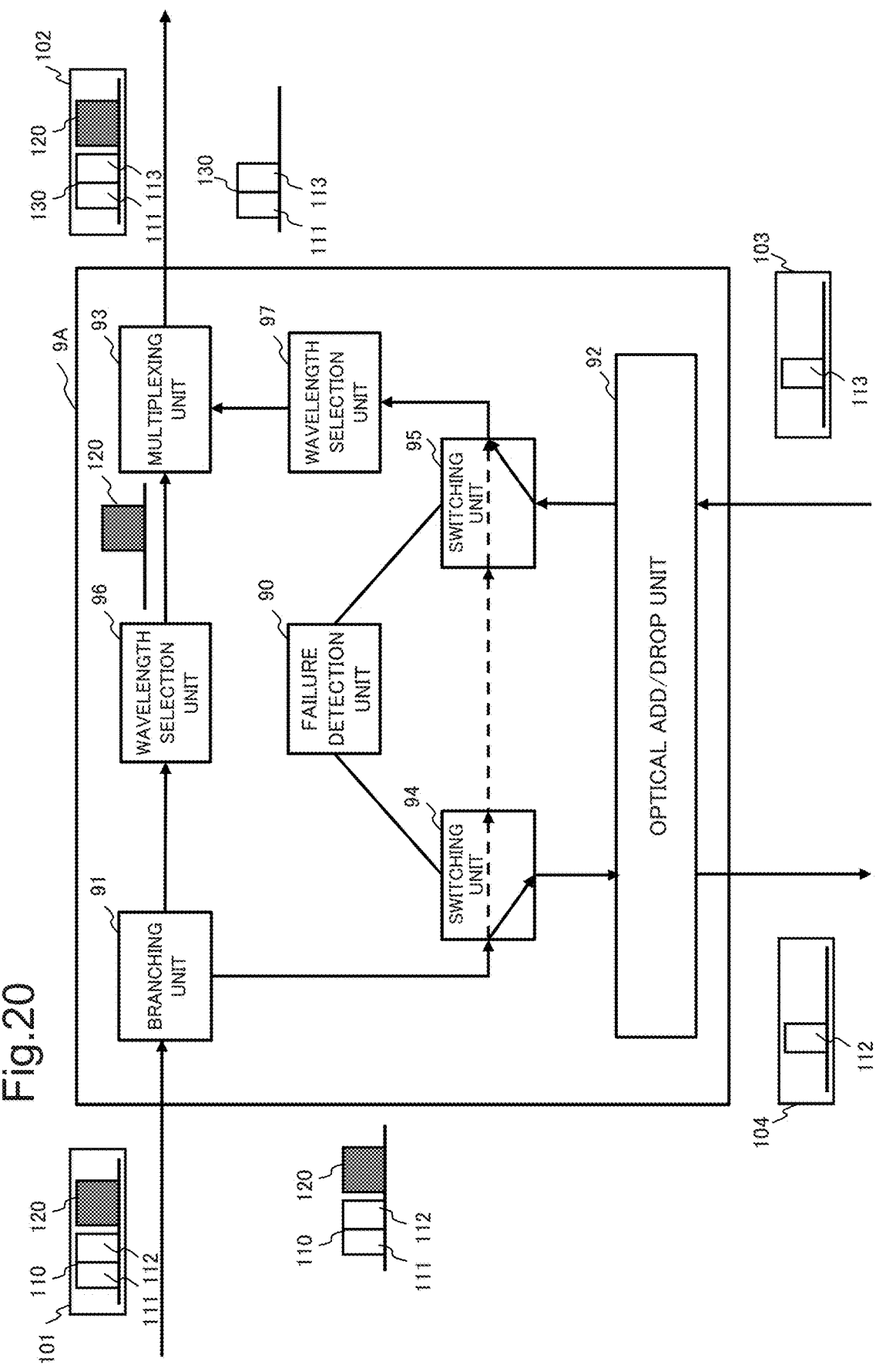
FIG. 20 is a diagram illustrating a configuration example of a submarine branching device according to a tenth example embodiment.
Figure 21:
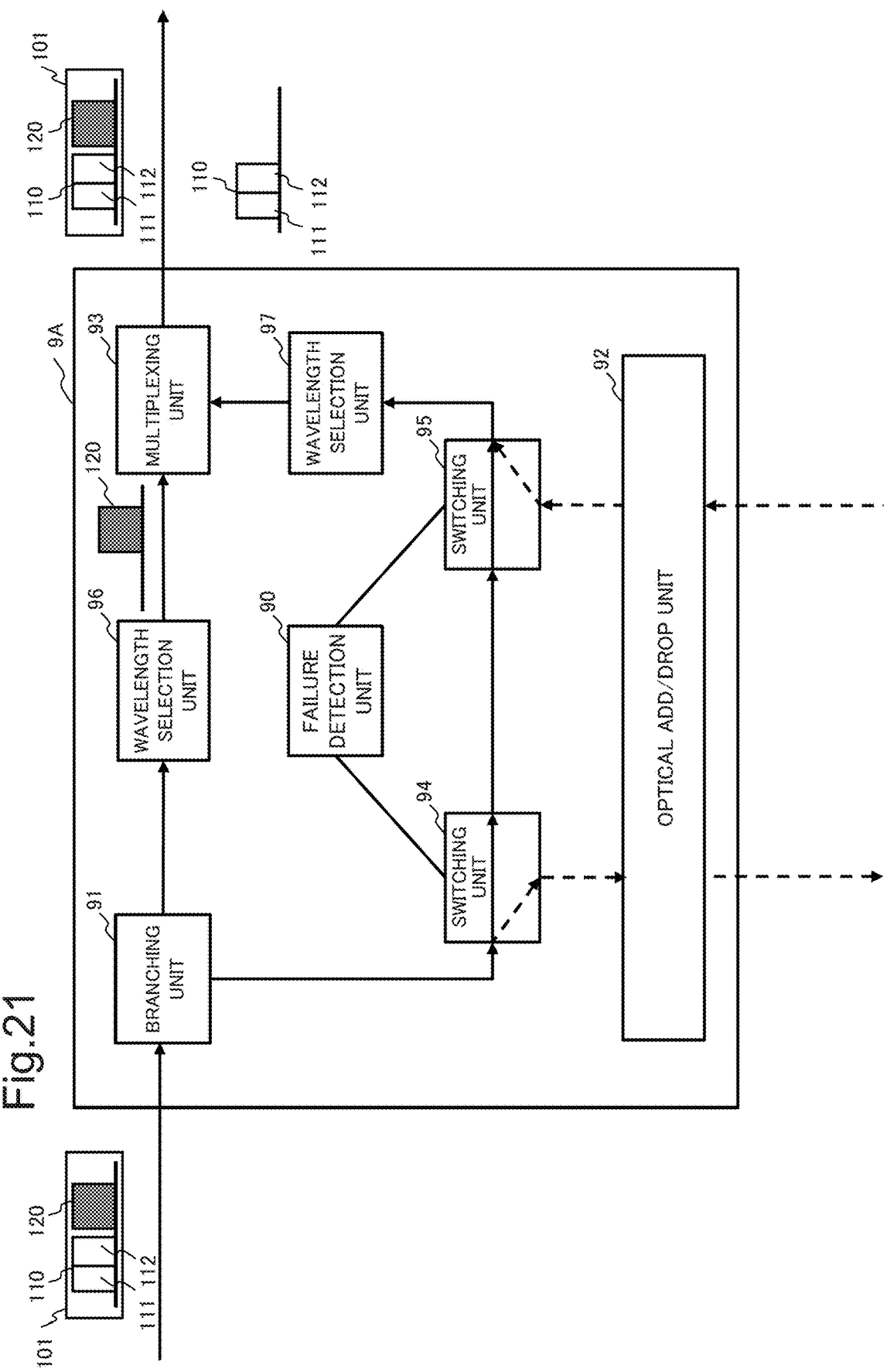
FIG. 21 is a diagram illustrating a configuration example of the submarine branching device according to the tenth example embodiment.

Compared with the configuration illustrated in FIG. 12, an optical submarine cable system according to the tenth example embodiment of the present invention includes a submarine branching device 9A in place of the submarine branching device 7A. FIG. 20 illustrates a configuration example of the submarine branching device 9A according to the tenth example embodiment of the present invention. The submarine branching device 9A includes a failure detection unit 90, a branching unit 91, an optical add/drop unit 92, a multiplexing unit 93, switching units 94 and 95, and wavelength selection units 96 and 97. A solid arrow in FIG. 20 indicates a signal flow under normal operation. FIG. 21 illustrates a configuration example of the submarine branching device 9A in a case of the switching units 94 and 95 switching signal paths. A solid arrow in FIG. 21 indicates a signal flow in the case of the switching units 94 and 95 switching the signal paths.

The failure detection unit 90 detects a failure on a transmission line through an optical submarine cable. According to the present example embodiment, the failure detection unit 90 detects a failure on a transmission line through an optical submarine cable 4 between a terminal station 3 and the submarine branching device 9A. The failure detection unit 90 may detect a failure on a transmission line between another terminal station and the submarine branching device. In response to detection of a failure, the failure detection unit 90 instructs the switching units 94 and 95, to be described later, to switch signal paths. The failure detection unit 90 may monitor a WDM signal input to the submarine branching device 9A and detect a failure on the transmission line in response to signal quality degradation or signal interruption of the monitored WDM signal. Further, the failure detection unit 90 may detect a failure by receiving failure occurrence information from a terminal station or another submarine branching device. When the submarine branching device 9A receives power supply from at least one of terminal stations 1, 2, and 3, a failure may be detected in response to interruption of the power supply. In place of the failure detection unit 90, an unillustrated monitor unit may detect a failure on the transmission line. In this case, the failure detection unit 90 issues an instruction to the switching units 94 and 95 in response to detection of a failure by the monitor unit.

The branching unit 91 branches an input WDM signal and outputs the branched signals. For example, the branching unit 91 may be configured with an optical coupler.

The optical add/drop unit 92 has a function of adding/dropping a specific wavelength. Further, the optical add/drop unit 92 has a function and a configuration similar to those of the optical add/drop devices 52, 63, 64, 72, and 82 according to the aforementioned example embodiments.

The multiplexing unit 93 multiplexes input optical signals and outputs the multiplexed signal. For example, the multiplexing unit 93 may be an optical coupler.

The switching units 94 and 95 switch optical signal paths by switching input/output ends of the optical signals. As described above, the switching units 94 and 95 switch optical signal paths in accordance with an instruction from the failure detection unit 90. For example, each of the switching units 94 and 95 is configured with an optical switch.

Each of the wavelength selection units 96 and 97 selectively transmits and outputs a specific wavelength in an input WDM signal. According to the present example embodiment, the wavelength selection unit 96 selectively outputs a signal at a wavelength band of an L-band signal 120, and the wavelength selection unit 97 outputs signals at wavelength bands of C-band signals 110 and 130. For example, each of the wavelength selection units 96 and 97 may be configured with an optical filter. Further, each of the wavelength selection units 96 and 97 may be configured with an optical switch and optical filters. In this case, a selectively transmitted wavelength band can be changed by switching, by the optical switch, an optical filter to which an optical signal is input.

The multiplexing unit 93 and the wavelength selection units 96 and 97 may be integrally configured with a three-port optical filter or a WSS.

Switching of signal paths in response to occurrence of a failure will be described along a signal path of a WDM signal 101 input from the terminal station 1.

In signal paths illustrated in FIG. 20, the WDM signal 101 input to the branching unit 91 is branched and is output to the switching unit 94 and the wavelength selection unit 96.

The WDM signal input to the switching unit 94 is input to the optical add/drop unit 92 and undergoes add/drop with a WDM signal 103 from the terminal station 3. A WDM signal output from the optical add/drop unit 92 is input to the wavelength selection unit 97 through the switching unit 95, and the C-band signal 130 transmitted in the wavelength selection unit 97 is input to the multiplexing unit 93. Although not illustrated in FIG. 20, the WDM signal 103 may include dummy signals at wavelength bands related to a band signal 111 and the L-band signal 120. A WDM signal 104 output from the optical add/drop unit 92 may include not only a band signal 112 but also the band signal 111 and the L-band signal 120, or may include dummy signals at wavelength bands related to the band signal 111 and the L-band signal 120. When the optical add/drop unit 92 does not support add/drop of a wavelength band in the L-band, the wavelength selection unit 97 may be provided on a signal path input from the branching unit 91 to the optical add/drop unit 92 through the switching unit 94, and a wavelength band of the L-band signal 120 may be blocked. With the above configuration, a wavelength band being an add/drop target of the optical add/drop unit 92 becomes the C-band signals 110 and 130. Further, an optical signal having an L-band wavelength band is not transmitted over the transmission line between the terminal station 3 and the submarine branching device 9A.

The band signal 120 in the WDM signal input to the wavelength selection unit 96 is selectively transmitted and is input to the multiplexing unit.

The multiplexing unit 93 multiplexes the optical signals input from two directions and outputs a WDM signal 102 to the terminal station 2.

Next, signal paths after switching by the switching units 94 and 95 will be described. The switching units 94 and 95 switch the signal paths in FIG. 21. By the failure detection unit 90 issuing an instruction to switch the signal paths in response to detection of a failure, the switching units 94 and 95 execute switching of the signal paths. By switching of the signal paths, the WDM signal output by the branching unit 91 is input to the multiplexing unit 93 through the wavelength selection unit 97 without being input to the optical add/drop unit 92.

On the other hand, the L-band signal 120 in the WDM signal branched and output by the branching unit 91 is input to the multiplexing unit 93 through the wavelength selection unit 96 regardless of the switching of the signal paths by the switching units 94 and 95.

Operation

Figure 18:
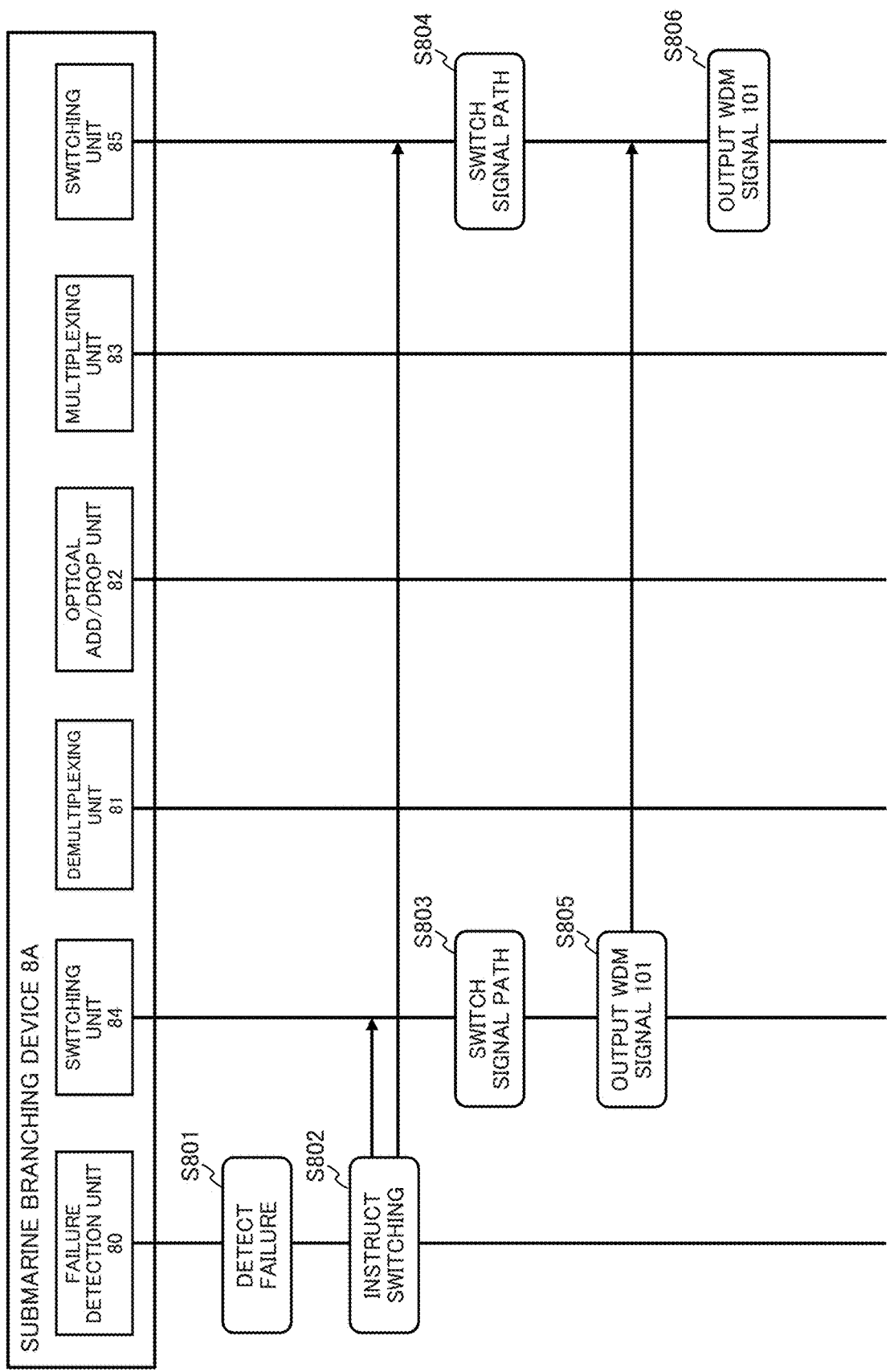
FIG. 18 is a sequence diagram illustrating an operation example of the submarine branching device according to the eighth example embodiment.

An operation of the failure detection unit 90 instructing the switching units 94 and 95 to switch the signal paths, in response to occurrence of a failure, is similar to the sequence diagram illustrated in FIG. 18, and therefore detailed description thereof is omitted.

Effects

In general, when a signal path is switched by an optical switch, the signal is interrupted for a very short period of time before the switching is completed. It is assumed in a submarine cable system that signal quality is affected even by signal interruption for a very short period of time. In the submarine branching device 9A, a signal path of the L-band signal 120 transmitted between the terminal station 1 and the terminal station 2 is not changed before and after the switching units 94 and 95 switch signal paths. Accordingly, the submarine branching device 9A can keep signal quality unaffected by not interrupting traffic transmitted between the terminal station 1 and the terminal station 2 while executing switching of signal paths at occurrence of a failure in traffic transmitted to/from the terminal station 3.

Figure 22:
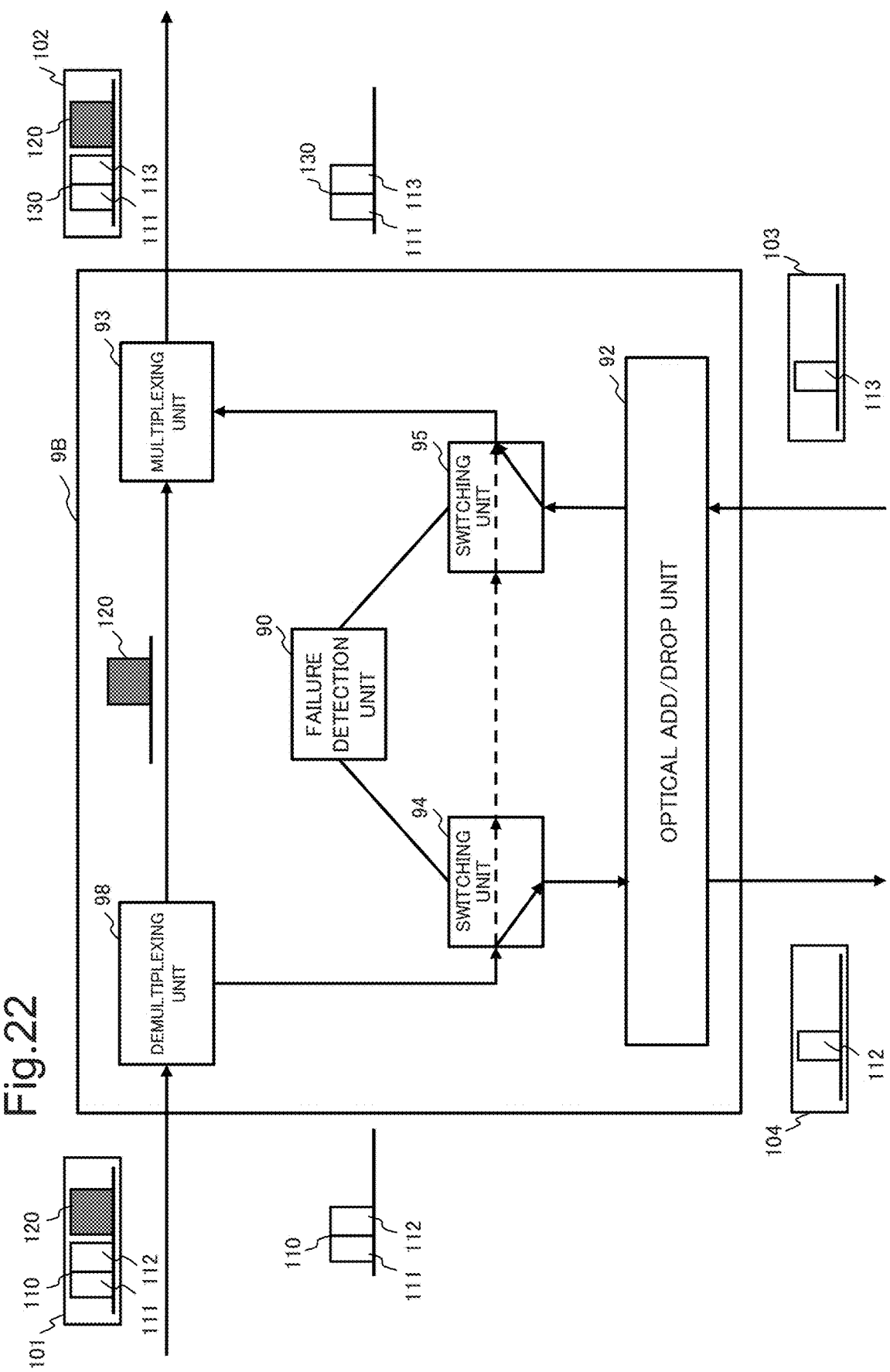
FIG. 22 is a diagram illustrating a configuration example of the submarine branching device according to the tenth example embodiment.
Figure 23:
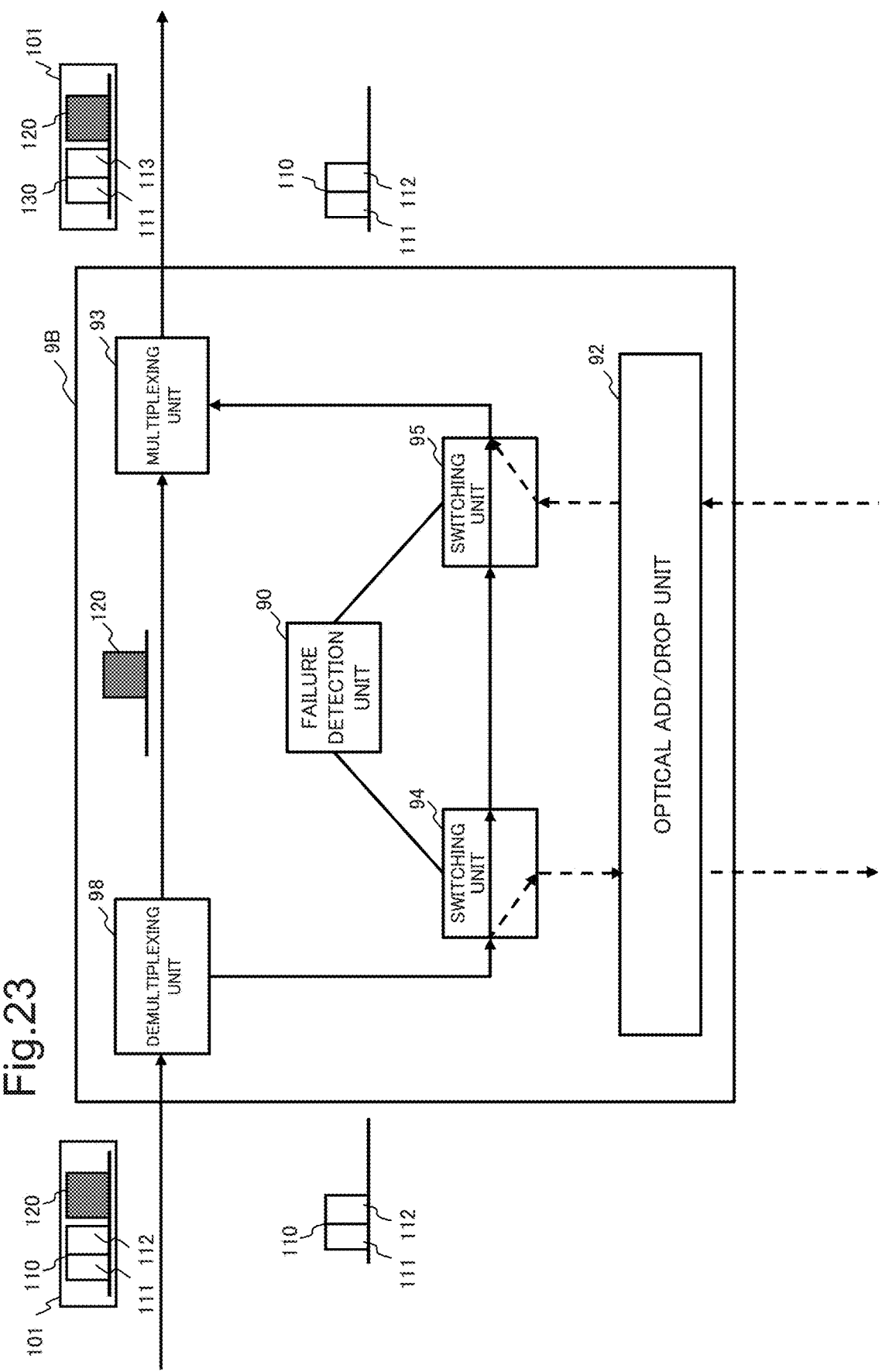
FIG. 23 is a diagram illustrating a configuration example of the submarine branching device according to the tenth example embodiment.

The configuration of the present example embodiment may be changed as appropriate within the scope thereof. For example, a demultiplexing unit demultiplexing an input WDM signal and outputting specific wavelengths may be provided in place of the branching unit 91 in FIGS. 20 and 21. FIGS. 22 and 23 illustrate a configuration in which a demultiplexing unit 98 is provided in place of the branching unit 91. FIGS. 22 and 23 further illustrate signal paths before and after switching by the switching units 94 and 95.

A WDM signal input from the terminal station 1 is demultiplexed into the C-band signal 110 and the L-band signal 120, and the signals are input to the switching unit 94 and the multiplexing unit 93, respectively. As illustrated in FIGS. 22 and 23, a signal path of the L-band signal 120 is not changed by switching by the switching units 94 and 95. Accordingly, occurrence of traffic interruption can be prevented similarly to the configuration illustrated in FIGS. 20 and 21.

While the C-band and the L-band have been described as an example of a plurality of wavelength bands similarly to the aforementioned example embodiments, a plurality of wavelength bands applied to the present example embodiment are not limited thereto. For example, both of the band signals 110 and 120 may be WDM signals having wavelengths in the C-band or the L-band.

Eleventh Example Embodiment

Configuration

An eleventh example embodiment of the present invention will be described. A submarine branching device according to the eleventh example embodiment of the present invention comprises a configuration to be capable of controlling a configuration in the submarine branching device in response to a control signal input from a terminal station.

Figure 24:
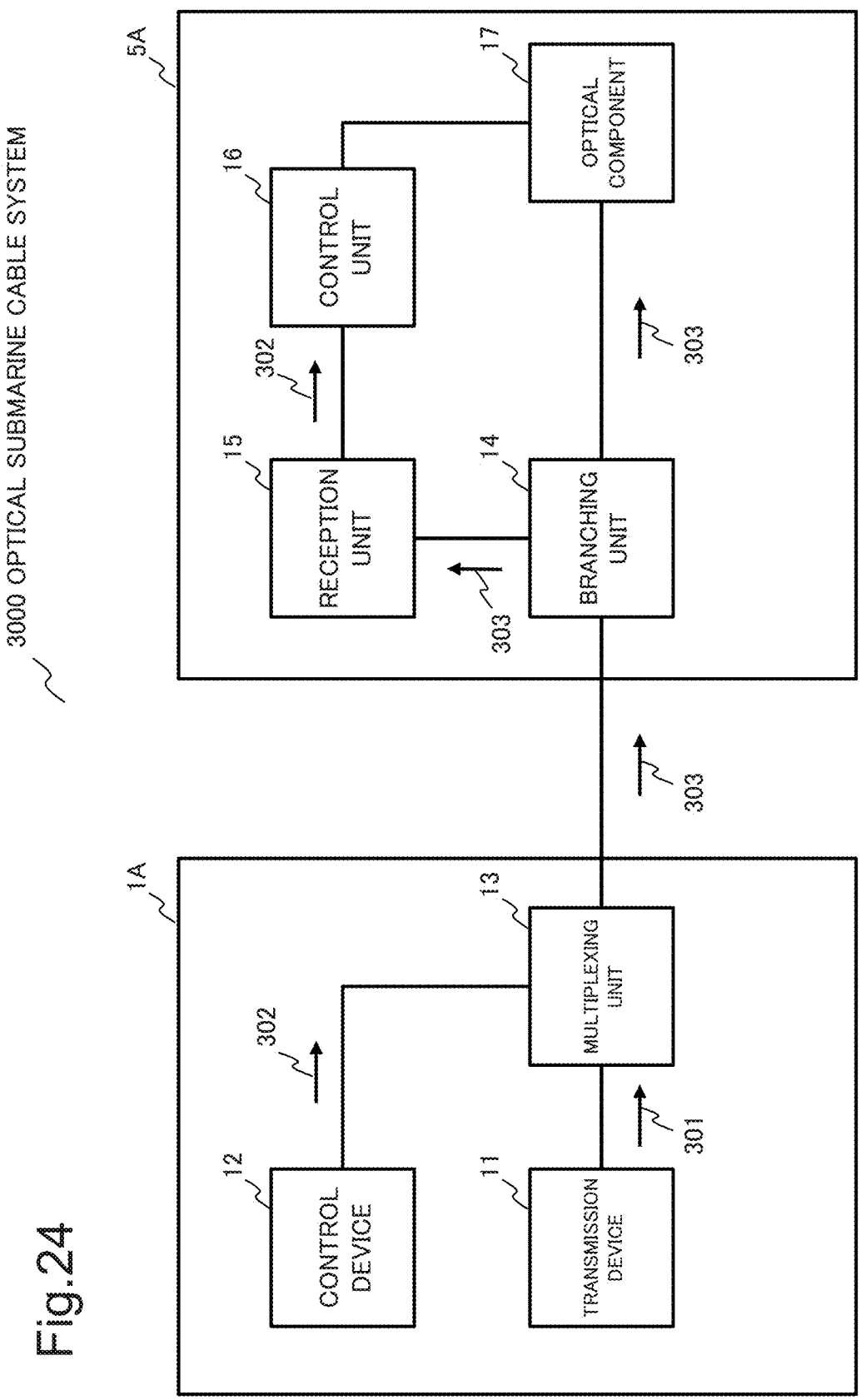
FIG. 24 is a diagram illustrating a configuration example of an optical submarine cable system according to an eleventh example embodiment.

FIG. 24 illustrates a configuration example of an optical submarine cable system 3000 according to the eleventh example embodiment. The optical submarine cable system 3000 includes a terminal station 1A and a submarine branching device 5A. The optical submarine cable system 3000 may include a plurality of other terminal stations, similarly to the configuration illustrated in FIG. 1.

The terminal station 1A includes a transmission device 11, a control device 12, and a multiplexing unit 13.

The transmission device 11 generates a main signal 301 transmitted to a facing terminal station. The transmission device outputs the main signal 301 to the multiplexing unit 13. For example, the transmission device 11 generates the main signal 301 with a light source and a modulator. The terminal station device may include a plurality of transmission devices equivalent to the transmission device 11.

The control device 12 generates a control signal 302 targeting the submarine branching device 5. The control device 12 outputs the control signal 302 to the multiplexing unit 13. For example, the control device 12 may generate the control signal 302 by modulating light at a wavelength not included in the main signal 301.

The multiplexing unit 13 generates a WDM signal 303 from the main signal 301 and the control signal 302. The multiplexing unit 13 may include a modulator and modulate the main signal 301 in accordance with the control signal 302. Further, the multiplexing unit 13 may modulate a specific wavelength band in accordance with the control signal 302 or may modulate the entire main signal 301. When the multiplexing unit 13 modulates the entire main signal 301, for example, the modulation may be performed with a sufficiently low-frequency component compared with the main signal.

The transmission device 11 may be configured to include the control device 12 and the multiplexing unit 13.

The submarine branching device 5A includes a branching unit 14, a reception unit 15, a control unit 16, and an optical component 17. Although not illustrated, the submarine branching device 5 may include a configuration included in the submarine branching device according to another example embodiment.

The branching unit 14 branches the WDM signal 303 input from the terminal station 1 and outputs the branched signals to the reception unit 15 and the optical component 17. For example, the branching unit 14 may be an optical coupler.

Figure 25:
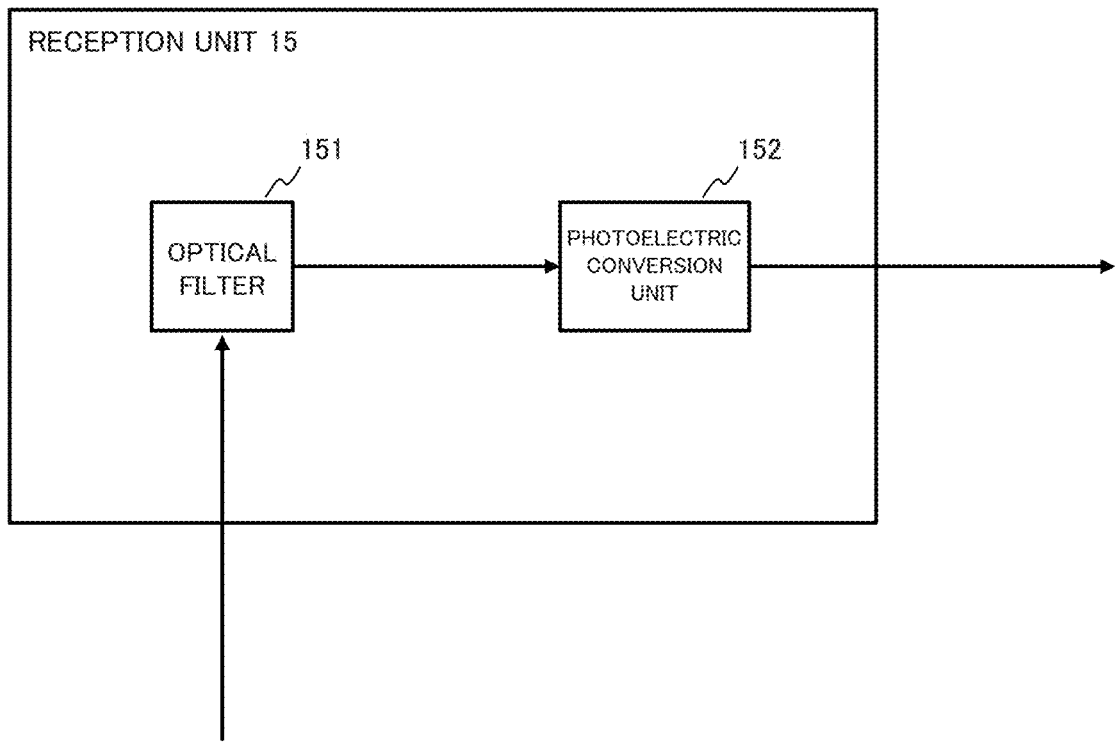
FIG. 25 is a diagram illustrating a configuration example of a reception unit according to the eleventh example embodiment.
Figure 26:
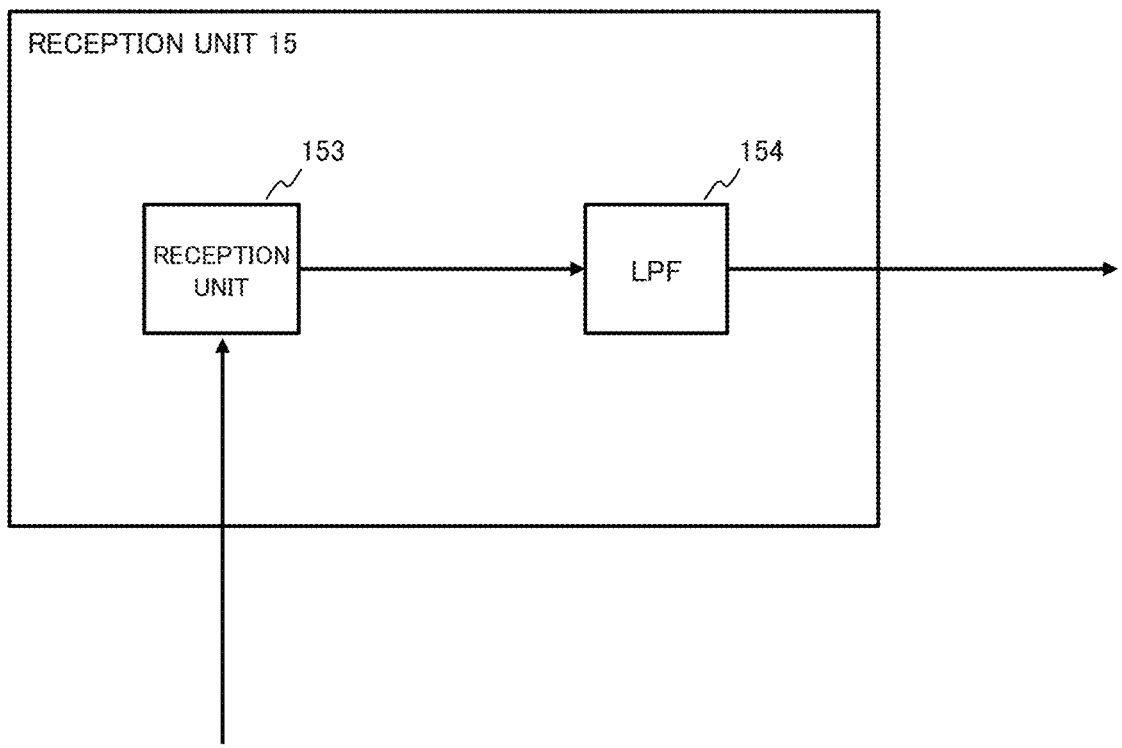
FIG. 26 is a diagram illustrating a configuration example of the reception unit according to the eleventh example embodiment.

The reception unit 15 extracts the control signal 302 from the WDM signal 303. The reception unit 15 outputs the control signal 302 to the control unit 16. FIG. 25 illustrates a configuration example of the reception unit 15 according to the eleventh example embodiment. When the control signal 302 is generated by modulating light at a wavelength not included in the main signal 301 as described above, the reception unit 15 may include an optical filter 151 and a photoelectric conversion unit 152, as illustrated in FIG. 25. The optical filter 151 extracts a wavelength band of the control signal 302 from the WDM signal 303. The photoelectric conversion unit 152 converts the extracted control signal 302 into an electric signal and outputs the converted signal to the control unit 16. FIG. 26 illustrates another configuration example of the reception unit 15 according to the eleventh example embodiment. When the control signal 302 is generated by modulating the entire wavelength band of the main signal 301 as described above, the reception unit 15 may include a photoelectric conversion unit 153 and a low-pass filter (LPF) 154, as illustrated in FIG. 26. The photoelectric conversion unit 153 converts the WDM signal 303 into an electric signal. The LPF 154 extracts a low-frequency modulation component in the converted electric signal and outputs the control signal 302.

In FIG. 24, the control unit 16 executes control over the optical component 17 in accordance with the control signal 302 input from the reception unit 15.

Figure 27:
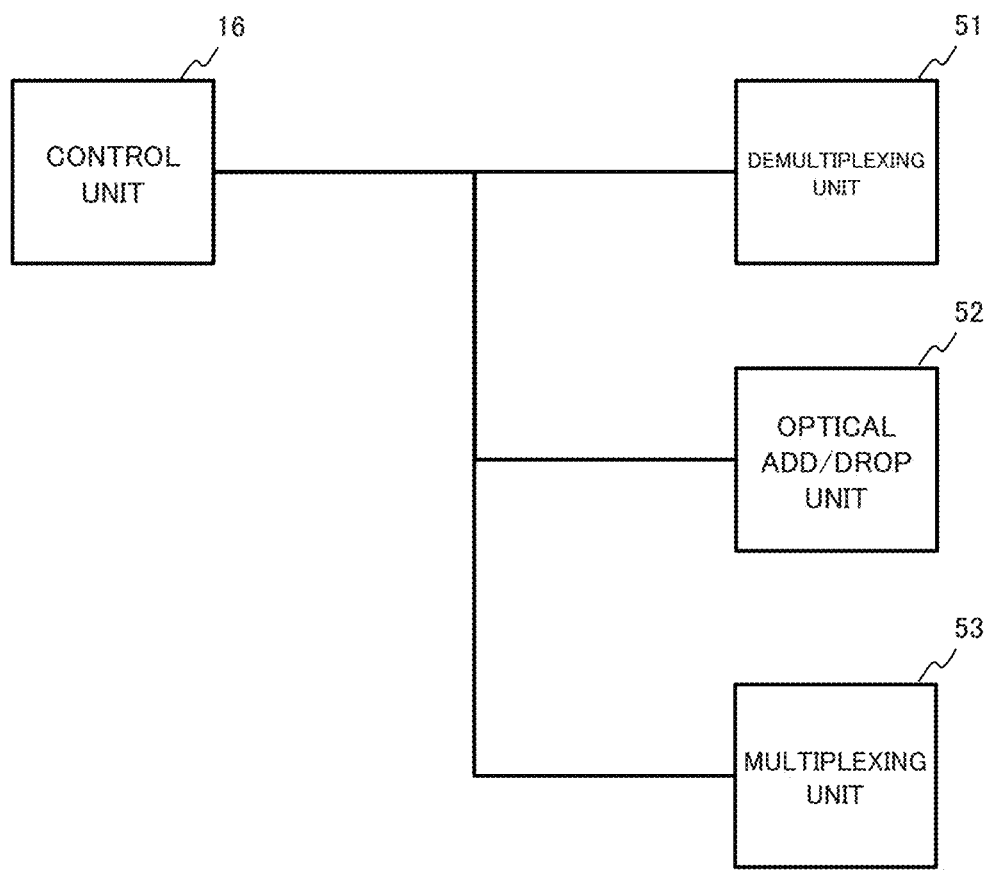
FIG. 27 is a diagram illustrating a configuration example of a control unit and an optical component, according to the eleventh example embodiment.

The WDM signal 303 is input to the optical component 17 from the branching unit 14. The optical component 17 is an optical part controllable in accordance with an instruction from the control unit 16. For example, as illustrated in FIG. 27, optical components 17 being control targets of the control unit 16 may include a demultiplexing unit 51, an optical add/drop unit 52, and a multiplexing unit 53. Without being limited to the above, the optical component 17 may have a configuration changeable by a control device, according to another example embodiment.

Operation

Figure 28:
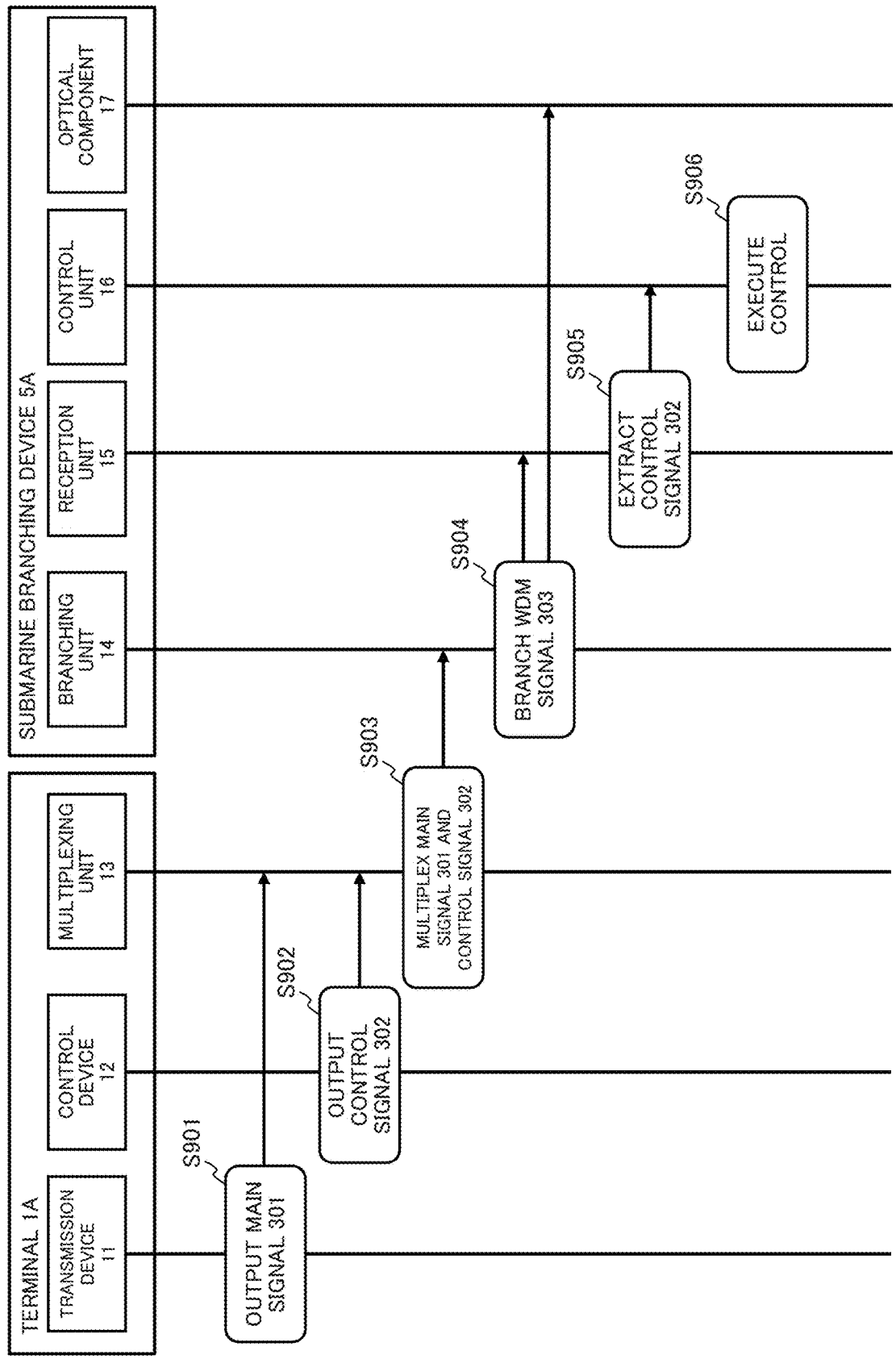
FIG. 28 is a sequence diagram illustrating an operation example of a submarine branching device according to the eleventh example embodiment.

An operation example according to the present example embodiment will be described by use of FIG. 28.

The transmission device 11 outputs the main signal 301 to the multiplexing unit 13 (S901).

The control device 12 outputs the control signal 302 to the multiplexing unit 13 (S902). An order in which S901 and S902 are executed is not limited. For example, S901 may be executed after S902 is executed, or S901 and S902 may be executed simultaneously.

The multiplexing unit 13 generates the WDM signal 303 from the main signal 301 input from the transmission device 11 and the control signal 302 input from the control device 12 (S903).

The branching unit 14 branches the WDM signal 303 input from the terminal station 1 and outputs the branched signals to the reception unit 15 and the optical component 17 (S904).

The reception unit 15 extracts the control signal 302 from the WDM signal 303 input from the branching unit 14 and outputs the extracted signal to the control unit 16 (S905).

The control unit 16 executes control over the optical component 17 in accordance with the control signal 302 input from the reception unit 15 (S906).

Effects

The submarine branching device according to the eleventh example embodiment of the present invention comprises a configuration to be capable of controlling a configuration in the submarine branching device in accordance with a control signal input from a terminal station. Consequently, an output destination of a WDM signal can be flexibly controlled on a per-wavelength basis. Accordingly, a submarine branching device capable of providing an optical transmission system using the C-band and the L-band can be provided.

Figure 29:
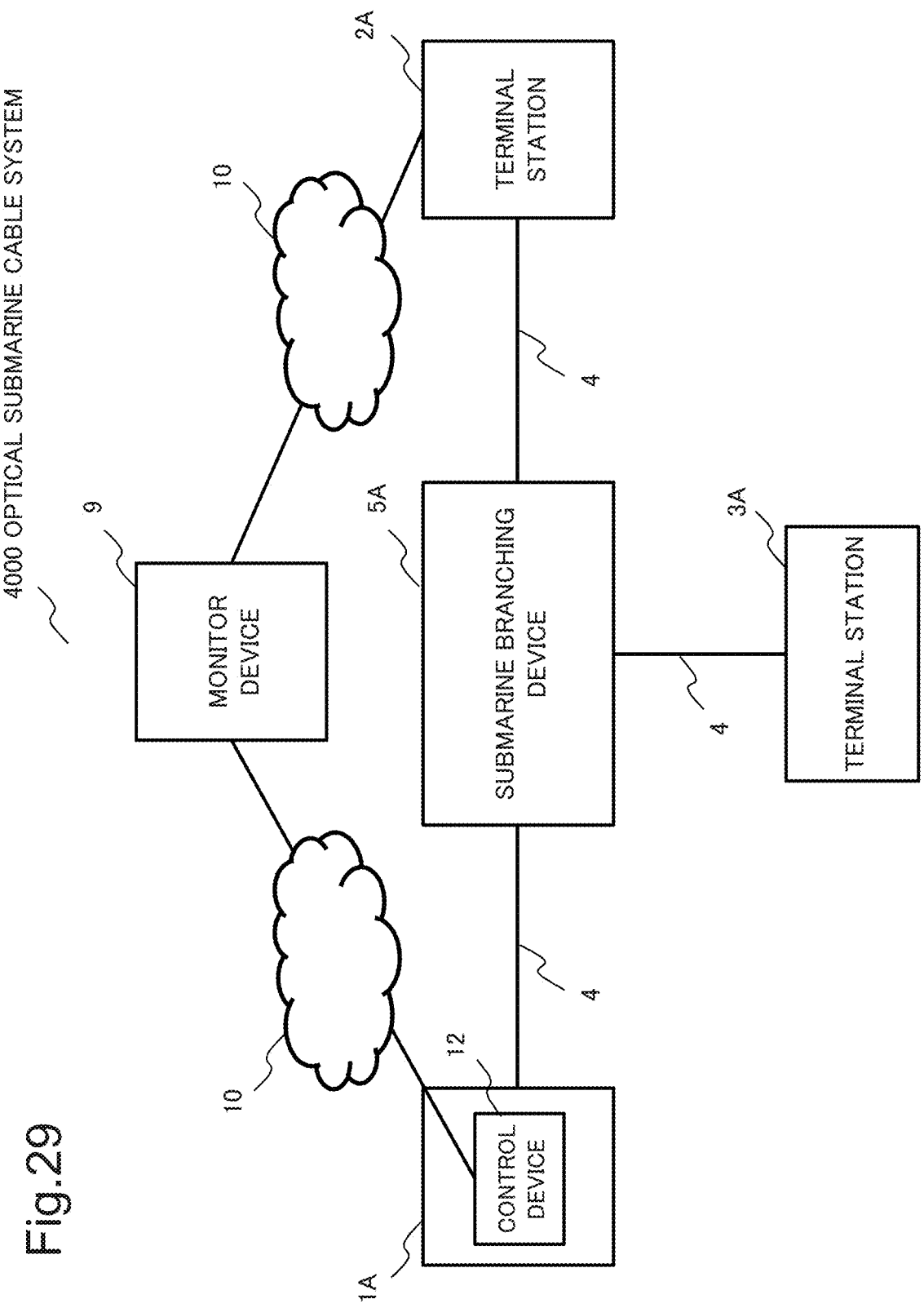
FIG. 29 is a diagram illustrating a configuration example of an optical submarine cable system according to the eleventh example embodiment.

Generation of the control signal by the control device may be based on transmission path information. At this time, as illustrated in FIG. 29, an optical submarine cable system 4000 may include a monitor device 9. The monitor device 9 monitors path information of the optical submarine cable system 4000 and also manages failure information in each device and on each path. Further, the monitor device 9 exchanges the path information with a control device 12 through a network 10. The network 10 may be an IP network.

The whole or part of the example embodiments disclosed above can be described as, but not limited to, the following supplementary notes.

Supplementary Note 1

A submarine branching device including:
  a branching means for branching a wavelength-multiplexed optical signal input from a first terminal station and outputting a first branch signal and a second branch signal;
  an optical add/drop means for outputting at least a first wavelength-multiplexed optical signal included in the first branch signal to a second terminal station, and multiplexing at least a second wavelength-multiplexed optical signal included in the first branch signal and a wavelength-multiplexed optical signal input from the second terminal station and outputting at least a third wavelength-multiplexed optical signal;
  a multiplexing means for multiplexing a fourth wavelength-multiplexed optical signal included in the second branch signal and the third wavelength-multiplexed optical signal and outputting the multiplexed signal to a third terminal station;
  a first switching means capable of outputting first branch light input from the branching means to the optical add/drop means;
  a second switching means capable of outputting a third wavelength-multiplexed optical signal input from the optical add/drop means to the multiplexing means; and
  a failure detection means for detecting a failure of a transmission line over which a wavelength-multiplexed optical signal is transmitted, wherein,
  in response to detection of a failure by the failure detection means, the first switching means is capable of switching a signal path from the optical add/drop means to the second switching means and outputting the first branch signal to the second switching means, and
  the second switching means is capable of switching a signal path from the optical add/drop means to the first switching means and outputting the first branch signal to the multiplexing means.

Supplementary Note 2

The submarine branching device according to Supplementary Note 1, further including
  a first wavelength selection means for transmitting the fourth wavelength-multiplexed optical signal in a second branch signal output by the branching means and outputting the transmitted signal to the multiplexing means.

Supplementary Note 3

The submarine branching device according to Supplementary Note 1 or 2, further including
  a second wavelength selection means for transmitting the third wavelength-multiplexed optical signal in a wavelength-multiplexed optical signal output by the optical add/drop means and outputting the transmitted signal to the multiplexing means.

Supplementary Note 4

A submarine branching device including:
  a demultiplexing means for demultiplexing a wavelength-multiplexed optical signal input from a first terminal station and outputting a first wavelength-multiplexed optical signal and a second wavelength-multiplexed optical signal;
  an optical add/drop means for outputting at least a third wavelength-multiplexed optical signal included in the first wavelength-multiplexed optical signal to a second terminal station, and multiplexing at least a fourth wavelength-multiplexed optical signal included in the first wavelength-multiplexed optical signal and a wavelength-multiplexed optical signal input from the second terminal station and outputting a fifth wavelength-multiplexed optical signal;
  a multiplexing means for multiplexing the second wavelength-multiplexed optical signal and the fifth wavelength-multiplexed optical signal and outputting the multiplexed signal to a third terminal station;
  a first switching means capable of outputting a first wavelength-multiplexed optical signal input from the demultiplexing means to the optical add/drop means;
  a second switching means capable of outputting a fifth wavelength-multiplexed optical signal input from the optical add/drop means to the multiplexing means; and
  a failure detection means for detecting a failure of a transmission line over which a wavelength-multiplexed optical signal is transmitted, wherein,
  in response to detection of a failure by the failure detection means, the first switching means is capable of switching a signal path from the optical add/drop means to the second switching means and outputting the first wavelength-multiplexed optical signal to the second switching means, and
  the second switching means is capable of switching a signal path from the optical add/drop means to the first switching means and outputting the first wavelength-multiplexed optical signal to the multiplexing means.

Supplementary Note 5

An optical submarine cable system including:
  first, second, and third terminal stations each of which being capable of outputting a wavelength-multiplexed optical signal; and
  a submarine branching device connected to the first, second, and third terminal stations through an optical submarine cable, wherein
  the submarine branching device includes:
    a branching means for branching a wavelength-multiplexed optical signal input from a first terminal station and outputting a first branch signal and a second branch signal;
    an optical add/drop means for outputting at least a first wavelength-multiplexed optical signal included in the first branch signal to a second terminal station, and multiplexing at least a second wavelength-multiplexed optical signal included in the first branch signal and a wavelength-multiplexed optical signal input from the second terminal station and outputting at least a third wavelength-multiplexed optical signal;
    a multiplexing means for multiplexing a fourth wavelength-multiplexed optical signal included in the second branch signal and the third wavelength-multiplexed optical signal and outputting the multiplexed signal to a third terminal station;

a first switching means capable of outputting first branch light input from the branching means to the optical add/drop means;

a second switching means capable of outputting a third wavelength-multiplexed optical signal input from the optical add/drop means to the multiplexing means; and a failure detection means for detecting a failure of a transmission line over which a wavelength-multiplexed optical signal is transmitted, in response to detection of a failure by the failure detection means, the first switching means is capable of switching a signal path from the optical add/drop means to the second switching means and outputting the first branch signal to the second switching means, and the second switching means is capable of switching a signal path from the optical add/drop means to the first switching means and outputting the first branch signal to the multiplexing means.

Supplementary Note 6

An optical submarine cable system including:

first, second, and third terminal stations each of which being capable of outputting a wavelength-multiplexed optical signal; and a submarine branching device connected to the first, second, and third terminal stations through an optical submarine cable, wherein the submarine branching device includes:

a demultiplexing means for demultiplexing a wavelength-multiplexed optical signal input from a first terminal station and outputting a first wavelength-multiplexed optical signal and a second wavelength-multiplexed optical signal;

an optical add/drop means for outputting at least a third wavelength-multiplexed optical signal included in the first wavelength-multiplexed optical signal to a second terminal station, and multiplexing at least a fourth wavelength-multiplexed optical signal included in the first wavelength-multiplexed optical signal and a wavelength-multiplexed optical signal input from the second terminal station and outputting a fifth wavelength-multiplexed optical signal;

a multiplexing means for multiplexing the second wavelength-multiplexed optical signal and the fifth wavelength-multiplexed optical signal and outputting the multiplexed signal to a third terminal station;

a first switching means capable of outputting a first wavelength-multiplexed optical signal input from the demultiplexing means to the optical add/drop means;

a second switching means capable of outputting a fifth wavelength-multiplexed optical signal input from the optical add/drop means to the multiplexing means; and a failure detection means for detecting a failure of a transmission line over which a wavelength-multiplexed optical signal is transmitted, in response to detection of a failure by the failure detection means, the first switching means is capable of switching a signal path from the optical add/drop means to the second switching means and outputting the first wavelength-multiplexed optical signal to the second switching means, and the second switching means is capable of switching a signal path from the optical add/drop means to the first switching means and outputting the first wavelength-multiplexed optical signal to the multiplexing means.

Supplementary Note 7

A submarine branching device including:

a first demultiplexing means for demultiplexing a wavelength-multiplexed optical signal input from a first terminal station into a first wavelength-multiplexed optical signal and a second wavelength-multiplexed optical signal;

an optical add/drop means for outputting at least a third wavelength-multiplexed optical signal included in the first wavelength-multiplexed optical signal to a second terminal station, and multiplexing at least a fourth wavelength-multiplexed optical signal included in the first wavelength-multiplexed optical signal and a wavelength-multiplexed optical signal input from the second terminal station and outputting a fifth wavelength-multiplexed optical signal; and a first multiplexing means for multiplexing the second wavelength-multiplexed optical signal and a fifth wavelength-multiplexed optical signal input from the optical add/drop means and outputting the multiplexed signal to a third terminal station.

Supplementary Note 8

The submarine branching device according to Supplementary Note 7, wherein the optical add/drop means includes:

a first branching means for branching a first wavelength-multiplexed optical signal input from the first demultiplexing means into a first optical branch signal and a second optical branch signal;

a first optical filter transmitting the fourth wavelength-multiplexed optical signal included in the first optical branch signal; and a second multiplexing means for multiplexing a fourth wavelength-multiplexed optical signal input from the first optical filter and a wavelength-multiplexed optical signal input from the second terminal station and outputting the fifth wavelength-multiplexed optical signal, and the optical add/drop means outputs a third wavelength-multiplexed optical signal included in the second optical branch signal to a second terminal station.

Supplementary Note 9

The submarine branching device according to Supplementary Note 8, wherein the optical add/drop means includes:

a second demultiplexing means for demultiplexing the second optical branch signal into the third wavelength-multiplexed optical signal and the sixth wavelength-multiplexed optical signal;

a processing means for performing waveform processing on a sixth wavelength-multiplexed optical signal input from the second demultiplexing means; and a third multiplexing means for multiplexing a third wavelength-multiplexed optical signal input from the second demultiplexing means and the waveform-processed sixth wavelength-multiplexed optical signal and outputting the multiplexed signal to the second terminal station.

Supplementary Note 10

The submarine branching device according to Supplementary Note 8, wherein the optical add/drop means includes:

a second branching means for branching a wavelength-multiplexed optical signal input from the second terminal station into a third optical branch signal and a fourth optical branch signal;

a second optical filter transmitting a dummy signal included in the third optical branch signal; and a fourth multiplexing means for multiplexing the fourth optical branch signal and a dummy signal input from the second optical filter and outputting the multiplexed signal to the second terminal station.

Supplementary Note 11

The submarine branching device according to any one of Supplementary Notes 7 to 10, further including a failure detection means for detecting a failure of a transmission line over which a wavelength-multiplexed optical signal is transmitted, wherein, in response to detection of a failure by the failure detection means, the optical add/drop means is capable of changing a wavelength band to be multiplexed and demultiplexed and outputting the first wavelength-multiplexed optical signal input from the first demultiplexing means to the first multiplexing means.

Supplementary Note 12

The submarine branching device according to any one of Supplementary Notes 7 to 10, further including:

a first switching means;

a second switching means; and a failure detection means for detecting a failure of a transmission line over which a wavelength-multiplexed optical signal is transmitted, wherein, in response to detection of a failure by the failure detection means, the first switching means is capable of switching a signal path from the first demultiplexing means to the second switching means and outputting a wavelength-multiplexed optical signal input from the first terminal station to the second switching means, and the second switching means is capable of switching a signal path from the first multiplexing means to the first switching means and outputting a wavelength-multiplexed optical signal input from the first switching means to the third terminal station.

Supplementary Note 13

The submarine branching device according to any one of Supplementary Notes 7 to 12, further including a control means for detecting a control signal superposed on a wavelength-multiplexed optical signal input from the first terminal station, wherein the control means controls the optical add/drop means in accordance with the control signal.

Supplementary Note 14

A submarine branching device including:

a first demultiplexing means for demultiplexing a wavelength-multiplexed optical signal input from a first terminal station into a first wavelength-multiplexed optical signal and a second wavelength-multiplexed optical signal;

a second demultiplexing means for demultiplexing a wavelength-multiplexed optical signal input from a second terminal station into a third wavelength-multiplexed optical signal and a fourth wavelength-multiplexed optical signal;

a first optical add/drop means for dropping at least a fifth wavelength-multiplexed optical signal included in the first wavelength-multiplexed optical signal, and multiplexing at least a sixth wavelength-multiplexed optical signal included in the first wavelength-multiplexed optical signal and the third wavelength-multiplexed optical signal and outputting a seventh wavelength-multiplexed optical signal;

a second optical add/drop means for dropping at least an eighth wavelength-multiplexed optical signal included in the second wavelength-multiplexed optical signal, and multiplexing at least a ninth wavelength-multiplexed optical signal included in the second wavelength-multiplexed optical signal and the fourth wavelength-multiplexed optical signal and outputting a tenth wavelength-multiplexed optical signal;

a first multiplexing means for multiplexing the fifth wavelength-multiplexed optical signal and the eighth wavelength-multiplexed optical signal and outputting the multiplexed signal to a second terminal station; and a second multiplexing means for multiplexing the seventh wavelength-multiplexed optical signal and the tenth wavelength-multiplexed optical signal and outputting the multiplexed signal to a third terminal station.

Supplementary Note 15

An optical submarine cable system including:

first, second, and third terminal stations each of which being capable of outputting a wavelength-multiplexed optical signal; and a submarine branching device connected to the first, second, and third terminal stations through an optical submarine cable, wherein the submarine branching device includes:

a first demultiplexing means for demultiplexing a wavelength-multiplexed optical signal input from the first terminal station into a first wavelength-multiplexed optical signal and a second wavelength-multiplexed optical signal;

an optical add/drop means for outputting at least a third wavelength-multiplexed optical signal included in the first wavelength-multiplexed optical signal to the second terminal station, and multiplexing at least a fourth wavelength-multiplexed optical signal included in the first wavelength-multiplexed optical signal and a wavelength-multiplexed optical signal input from the second terminal station and outputting a fifth wavelength-multiplexed optical signal; and a first multiplexing means for multiplexing the second wavelength-multiplexed optical signal and a fifth wavelength-multiplexed optical signal input from the optical add/drop means and outputting the multiplexed signal to the third terminal station.

Supplementary Note 16

The optical submarine cable system according to Supplementary Note 15, wherein the optical add/drop means includes:

a first branching means for branching a first wavelength-multiplexed optical signal input from the demultiplexing means into a first optical branch signal and a second optical branch signal;

a first optical filter transmitting the fourth wavelength-multiplexed optical signal included in the first optical branch signal; and a second multiplexing means for multiplexing a fourth wavelength-multiplexed optical signal input from the first optical filter and a wavelength-multiplexed optical signal input from the second terminal station and outputting the fifth wavelength-multiplexed optical signal, and the optical add/drop means outputs a third wavelength-multiplexed optical signal included in the second optical branch signal to a second terminal station.

Supplementary Note 17

The optical submarine cable system according to Supplementary Note 16, wherein the optical add/drop means includes:

a second demultiplexing means for demultiplexing the second optical branch signal into the third wavelength-multiplexed optical signal and the sixth wavelength-multiplexed optical signal;

a processing means for performing waveform processing on a sixth wavelength-multiplexed optical signal input from the second demultiplexing means; and a third multiplexing means for multiplexing a third wavelength-multiplexed optical signal input from the second demultiplexing means and the waveform-processed sixth wavelength-multiplexed optical signal and outputting the multiplexed signal to the second terminal station.

Supplementary Note 18

The optical submarine cable system according to Supplementary Note 16, wherein the optical add/drop means includes:

a second branching means for branching a wavelength-multiplexed optical signal input from the second terminal station into a third optical branch signal and a fourth optical branch signal;

a second optical filter transmitting a dummy signal included in the third optical branch signal; and a fourth multiplexing means for multiplexing the fourth optical branch signal and a dummy signal input from the second optical filter and outputting the multiplexed signal to the second terminal station.

Supplementary Note 19

The optical submarine cable system according to any one of Supplementary Notes 15 to 18, further including a failure detection means for detecting a failure of a transmission line over which a wavelength-multiplexed optical signal is transmitted, wherein, in response to detection of a failure by the failure detection means, the optical add/drop means is capable of changing a wavelength band to be multiplexed and demultiplexed and outputting the first wavelength-multiplexed optical signal input from the first demultiplexing means to the first multiplexing means.

Supplementary Note 20

The optical submarine cable system according to any one of Supplementary Notes 15 to 18, further including:

a first switching means;

a second switching means; and a failure detection means for detecting a failure of a transmission line over which a wavelength-multiplexed optical signal is transmitted, wherein, in response to detection of a failure by the failure detection means, the first switching means is capable of switching a signal path from the first demultiplexing means to the second switching means and outputting a wavelength-multiplexed optical signal input from the first terminal station to the second switching means, and the second switching means is capable of switching a signal path from the first multiplexing means to the first switching means and outputting a wavelength-multiplexed optical signal input from the first switching means to the third terminal station.

Supplementary Note 21

The optical submarine cable system according to any one of Supplementary Notes 15 to 20, further including a control means for detecting a control signal superposed on a wavelength-multiplexed optical signal input from the first terminal station, wherein the control means controls the optical add/drop means in accordance with the control signal.

Supplementary Note 22

An optical submarine cable system including:

first, second, and third terminal stations each of which being capable of outputting a wavelength-multiplexed optical signal; and a submarine branching device connected to the first, second, and third terminal stations through an optical submarine cable, wherein the submarine branching device includes:

a first demultiplexing means for demultiplexing a wavelength-multiplexed optical signal input from a first terminal station into a first wavelength-multiplexed optical signal and a second wavelength-multiplexed optical signal;

a second demultiplexing means for demultiplexing a wavelength-multiplexed optical signal input from a second terminal station into a third wavelength-multiplexed optical signal and a fourth wavelength-multiplexed optical signal;

a first optical add/drop means for dropping at least a fifth wavelength-multiplexed optical signal included in the first wavelength-multiplexed optical signal, and multiplexing at least a sixth wavelength-multiplexed optical signal included in the first wavelength-multiplexed optical signal and the third wavelength-multiplexed optical signal and outputting a seventh wavelength-multiplexed optical signal;

a second optical add/drop means for dropping at least an eighth wavelength-multiplexed optical signal included in the second wavelength-multiplexed optical signal, and multiplexing at least a ninth wavelength-multiplexed optical signal included in the second wavelength-multiplexed optical signal and the fourth wavelength-multiplexed optical signal and outputting a tenth wavelength-multiplexed optical signal;

a first multiplexing means for multiplexing the fifth wavelength-multiplexed optical signal and the eighth wavelength-multiplexed optical signal and outputting the multiplexed signal to a second terminal station; and a second multiplexing means for multiplexing the seventh wavelength-multiplexed optical signal and the tenth wavelength-multiplexed optical signal and outputting the multiplexed signal to a third terminal station.

Supplementary Note 23

An optical communication method including:

demultiplexing a wavelength-multiplexed optical signal input from a first terminal station into a first wavelength-multiplexed optical signal and a second wavelength-multiplexed optical signal;

outputting at least a third wavelength-multiplexed optical signal included in the first wavelength-multiplexed optical signal to a second terminal station, and multiplexing at least a fourth wavelength-multiplexed optical signal included in the first wavelength-multiplexed optical signal and a wavelength-multiplexed optical signal input from a second terminal station and outputting a fifth wavelength-multiplexed optical signal; and multiplexing the second wavelength-multiplexed optical signal and the fifth wavelength-multiplexed optical signal and outputting the multiplexed signal to a third terminal station.

Supplementary Note 24

The optical communication method according to Supplementary Note 23, further including:

branching the demultiplexed first wavelength-multiplexed optical signal into a first optical branch signal and a second optical branch signal;

transmitting the fourth wavelength-multiplexed optical signal included in the first optical branch signal;

multiplexing the transmitted fourth wavelength-multiplexed optical signal and a wavelength-multiplexed optical signal input from the second terminal station and outputting the fifth wavelength-multiplexed optical signal; and outputting a third wavelength-multiplexed optical signal included in the second optical branch signal to a second terminal station.

Supplementary Note 25

The optical communication method according to Supplementary Note 24, further including:

demultiplexing the second optical branch signal into the third wavelength-multiplexed optical signal and the sixth wavelength-multiplexed optical signal;

performing waveform processing on a sixth wavelength-multiplexed optical signal input from the second demultiplexing means; and multiplexing a third wavelength-multiplexed optical signal input from the second demultiplexing means and the waveform-processed sixth wavelength-multiplexed optical signal and outputting the multiplexed signal to the second terminal station.

Supplementary Note 26

The optical communication method according to Supplementary Note 24, further including:

branching a wavelength-multiplexed optical signal input from the second terminal station into a third optical branch signal and a fourth optical branch signal;

transmitting a dummy signal included in the third optical branch signal; and multiplexing the fourth optical branch signal and the transmitted dummy signal and outputting the multiplexed signal to the second terminal station.

Supplementary Note 27

The optical communication method according to any one of Supplementary Notes 23 to 26, further including:

detecting a failure of a transmission line over which a wavelength-multiplexed optical signal is transmitted; and, in response to detection of a failure, changing a wavelength band to be multiplexed and demultiplexed and outputting the first wavelength-multiplexed optical signal to the second terminal station.

Supplementary Note 28

The optical communication method according to any one of Supplementary Notes 23 to 26, further including:

detecting a failure of a transmission line over which a wavelength-multiplexed optical signal is transmitted; and, in response to detection of a failure, switching a signal path and outputting a wavelength-multiplexed optical signal input from the first terminal station to the second terminal station.

Supplementary Note 29

The optical communication method according to any one of Supplementary Notes 23 to 28, further including:

detecting a control signal superposed on a wavelength-multiplexed optical signal input from the first terminal station; and controlling a wavelength band to be multiplexed and demultiplexed in accordance with the control signal.

Supplementary Note 30

An optical communication method including:

demultiplexing a wavelength-multiplexed optical signal input from a first terminal station into a first wavelength-multiplexed optical signal and a second wavelength-multiplexed optical signal;

demultiplexing a wavelength-multiplexed optical signal input from a second terminal station into a third wavelength-multiplexed optical signal and a fourth wavelength-multiplexed optical signal;

dropping at least a fifth wavelength-multiplexed optical signal included in the first wavelength-multiplexed optical signal, and multiplexing at least a sixth wavelength-multiplexed optical signal included in the first wavelength-multiplexed optical signal and the third wavelength-multiplexed optical signal and outputting a seventh wavelength-multiplexed optical signal;

dropping at least an eighth wavelength-multiplexed optical signal included in the second wavelength-multiplexed optical signal, and multiplexing at least a ninth wavelength-multiplexed optical signal included in the second wavelength-multiplexed optical signal and the fourth wavelength-multiplexed optical signal and outputting a tenth wavelength-multiplexed optical signal;

multiplexing the fifth wavelength-multiplexed optical signal and the eighth wavelength-multiplexed optical signal and outputting the multiplexed signal to a second terminal station; and multiplexing the seventh wavelength-multiplexed optical signal and the tenth wavelength-multiplexed optical signal and outputting the multiplexed signal to a third terminal station.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2018-057359, filed on Mar. 26, 2018, the disclosure of which is incorporated herein in its entirety by reference.

REFERENCE SIGNS LIST 1, 1A, 2, 2A, 3, 3A Terminal station
4 Optical submarine cable
5, 5A, 6, 7A, 7B, 8A, 8B, 9A, 9B Submarine branching device
9 Monitor device
10 Network
11 Transmission device
12 Control device
13, 53, 65, 66, 73, 76, 83, 88, 93, 523, 526, 531 Multiplexing unit
14, 91, 521, 527 Branching unit
15 Reception unit
16 Control unit
17 Optical component
51, 61, 62, 71, 74, 81, 86, 98, 524 Demultiplexing unit
52, 52A, 52B, 52C, 72, 82, 92 Optical add/drop unit
63 C-band optical add/drop unit
64 L-band optical add/drop unit
70, 80, 90 Failure detection unit
75, 87, 525 Processing unit
84, 85, 94, 95 Switching unit
101, 102, 103, 104, 105, 106, 107, 108, 109, 201, 202, 203, 204, 303 WDM signal
110, 130, 140, 210, 230 C-band signal
111, 112, 113, 211, 212, 213, 221, 222, 223 Band signal
114, 117, 118 Processed signal
115 Dummy signal
120, 220, 240 L-band signal
151 Optical filter
152, 153 Photoelectric conversion unit
154 LPF
301 Main signal
302 Control signal
522, 528, 529, 530 Wavelength selection unit
1000, 2000, 3000, 4000 Optical submarine cable system

The invention claimed is:

1. A submarine branching device comprising:
a first demultiplexer configured to demultiplex a wavelength-multiplexed optical signal input from a first terminal station into a first wavelength-multiplexed optical signal and a second wavelength-multiplexed optical signal;
an optical add/drop portion configured to output at least a third wavelength-multiplexed optical signal included in the first wavelength-multiplexed optical signal to a second terminal station, and output a fifth wavelength-multiplexed optical signal multiplexed with a fourth wavelength-multiplexed optical signal included in the first wavelength-multiplexed optical signal and a wavelength-multiplexed optical signal input from the second terminal station; and
a first multiplexer configured to multiplex the second wavelength-multiplexed optical signal and a fifth wavelength-multiplexed optical signal input from the optical add/drop portion and output the multiplexed signal to a third terminal station
wherein the optical add/drop portion includes:
a first branch portion configured to branch the first wavelength-multiplexed optical signal input from the first demultiplexer into a first optical branch signal and a second optical branch signal;
a first optical filter configured to transmit the fourth wavelength-multiplexed optical signal included in the first optical branch signal; and
a second multiplexer configured to multiplex the fourth wavelength-multiplexed optical signal input from the first optical filter and the wavelength-multiplexed optical signal input from the second terminal station and outputting the fifth wavelength-multiplexed optical signal, and
the optical add/drop portion outputs the third wavelength-multiplexed optical signal included in the second optical branch signal to the second terminal station;
a second demultiplexer configured to demultiplex the second optical branch signal into the third wavelength-multiplexed optical signal and a sixth wavelength-multiplexed optical signal;
a processor configured to perform waveform processing on the sixth wavelength-multiplexed optical signal input from the second demultiplexer; and
a third multiplexer configured to multiplex the third wavelength-multiplexed optical signal input from the second demultiplexer and the waveform-processed sixth wavelength-multiplexed optical signal and output the multiplexed signal to the second terminal station.

2. The submarine branching device according to claim 1, further comprising
a failure detector configured to detect a failure of a transmission line over which a wavelength-multiplexed optical signal is transmitted, wherein,
in response to detection of a failure by the failure detector, the optical add/drop portion is capable of changing a wavelength band to be multiplexed and demultiplexed and outputting the first wavelength-multiplexed optical signal input from the first demultiplexer to the first multiplexer.

3. The submarine branching device according to claim 1, further comprising:
a first switch;
a second switch; and
a failure detector configured to detect a failure of a transmission line over which a wavelength-multiplexed optical signal is transmitted, wherein,
in response to detection of a failure by the failure detector, the first switch is capable of switching a signal path from the first demultiplexer to the second switch and outputting the wavelength-multiplexed optical signal input from the first terminal station to the second switch, and
the second switch is capable of switching a signal path from the first multiplexer to the first switch and outputting a wavelength-multiplexed optical signal input from the first switch to the third terminal station.

4. The submarine branching device according to claim 1, further comprising
a controller configured to detect a control signal superposed on the wavelength-multiplexed optical signal input from the first terminal station, wherein
the controller controls the optical add/drop portion in accordance with the control signal.

5. An optical submarine cable system comprising:
first, second, and third terminal stations each of which being capable of outputting a wavelength-multiplexed optical signal; and
a submarine branching device connected to the first, second, and third terminal stations through an optical submarine cable, wherein
the submarine branching device includes:
a first demultiplexer configured to demultiplex the wavelength-multiplexed optical signal input from the first terminal station into a first wavelength-multiplexed optical signal and a second wavelength-multiplexed optical signal;
an optical add/drop portion configured to output at least a third wavelength-multiplexed optical signal included in the first wavelength-multiplexed optical signal to the second terminal station, and output a fifth wavelength-multiplexed optical signal multiplexed with a fourth wavelength-multiplexed optical signal included in the first wavelength-multiplexed optical signal and a wavelength-multiplexed optical signal input from the second terminal station; and
a first multiplexer configured to multiplex the second wavelength-multiplexed optical signal and a fifth wavelength-multiplexed optical signal input from the optical add/drop portion and output the multiplexed signal to the third terminal station
wherein the optical add/drop portion includes:
a first branch portion configured to branch the first wavelength-multiplexed optical signal input from the demultiplexer into a first optical branch signal and a second optical branch signal;
a first optical filter configured to transmit the fourth wavelength-multiplexed optical signal included in the first optical branch signal; and
a second multiplexer configured to multiplex the fourth wavelength-multiplexed optical signal input from the first optical filter and the wavelength-multiplexed optical signal input from the second terminal station and output the fifth wavelength-multiplexed optical signal, and the optical add/drop portion outputs the third wavelength-multiplexed optical signal included in the second optical branch signal to the second terminal station;
a second demultiplexer configured to demultiplex the second optical branch signal into the third wavelength-multiplexed optical signal and a sixth wavelength-multiplexed optical signal;
a processor configured to perform waveform processing on the sixth wavelength-multiplexed optical signal input from the second demultiplexer; and
a third multiplexer configured to multiplex a third wavelength-multiplexed optical signal input from the second demultiplexer and the waveform-processed sixth wavelength-multiplexed optical signal and output the multiplexed signal to the second terminal station.

6. The optical submarine cable system according to claim 5, further comprising
a failure detector configured to detect a failure of a transmission line over which a wavelength-multiplexed optical signal is transmitted, wherein,
in response to detection of a failure by the failure detector, the optical add/drop portion is capable of changing a wavelength band to be multiplexed and demultiplexed and outputting the first wavelength-multiplexed optical signal input from the first demultiplexer to the first multiplexer.

7. The optical submarine cable system according to claim 5, further comprising:
a first switch;
a second switch; and
a failure detector configured to detect a failure of a transmission line over which a wavelength-multiplexed optical signal is transmitted, wherein,
in response to detection of a failure by the failure detector, the first switch is capable of switching a signal path from the first demultiplexer to the second switch and outputting the wavelength-multiplexed optical signal input from the first terminal station to the second switch, and
the second switch is capable of switching a signal path from the first multiplexer to the first switch and outputting a wavelength-multiplexed optical signal input from the first switch to the third terminal station.

8. The optical submarine cable system according to claim 5, further comprising
a controller configured to detect a control signal superposed on the wavelength-multiplexed optical signal input from the first terminal station, wherein
the controller controls the optical add/drop portion in accordance with the control signal.

* * * * *